US009013622B2

(12) United States Patent
Kawai

(10) Patent No.: US 9,013,622 B2
(45) Date of Patent: Apr. 21, 2015

(54) OPERATION DEVICE

(75) Inventor: Sumio Kawai, Hachioji (JP)

(73) Assignee: Olympus Imaging Corp., Tokyo (JP)

(*) Notice: Subject to any disclaimer, the term of this patent is extended or adjusted under 35 U.S.C. 154(b) by 304 days.

(21) Appl. No.: 13/612,624

(22) Filed: Sep. 12, 2012

(65) Prior Publication Data
US 2013/0093937 A1 Apr. 18, 2013

(30) Foreign Application Priority Data

Oct. 12, 2011 (JP) ................ 2011-224834
Oct. 12, 2011 (JP) ................ 2011-224835
Jul. 27, 2012 (JP) ................ 2012-166495

(51) Int. Cl.
H04N 5/232 (2006.01)

(52) U.S. Cl.
CPC ....... H04N 5/23212 (2013.01); H04N 5/23245 (2013.01); G03B 2217/002 (2013.01); G03B 2217/18 (2013.01)

(58) Field of Classification Search
CPC ................................ H04N 5/23212
USPC ........................................ 348/345
See application file for complete search history.

(56) References Cited

U.S. PATENT DOCUMENTS

| 5,327,188 A | 7/1994 | Kohmoto |
| 7,366,409 B2 | 4/2008 | Kurosawa |
| 7,432,635 B2 | 10/2008 | Kawai |
| 8,605,188 B2 | 12/2013 | Ishihara et al. |
| 2005/0081164 A1* | 4/2005 | Hama et al. ............ 715/830 |
| 2008/0110970 A1 | 5/2008 | Kataoka et al. |
| 2014/0085525 A1 | 3/2014 | Ishihara et al. |

FOREIGN PATENT DOCUMENTS

| CN | 1591560 A | 3/2005 |
| CN | 1677151 A | 10/2005 |
| JP | 2005084194 A | 3/2005 |
| JP | 2005-257726 A | 9/2005 |
| JP | 2005-316394 A | 11/2005 |

(Continued)

OTHER PUBLICATIONS

Japanese Office Action dated Sep. 2, 2014 in counterpart Japanese Application No. 2011-224834.

(Continued)

Primary Examiner — Roberto Velez
Assistant Examiner — Stephen Coleman
(74) Attorney, Agent, or Firm — Holtz, Holtz, Goodman & Chick PC

(57) ABSTRACT

An operation device includes a fixed member, an operation member arranged to be manually rotatable, a load section configured to apply a predetermined load to the operation member, a transducer configured to come into friction contact with the load section, a position detecting section configured to detect a relative position of the operation member with respect to the fixed member or the load section, an operation mode setting section, and an operation sense control section configured to control oscillation applied to the load section by the transducer to thereby change a sense of operation obtained from the operation member when the operation member is rotated. The operation sense control section causes, on the basis of an output from the position detecting section, the operation member to generate a sense of click corresponding to the set operation mode.

13 Claims, 26 Drawing Sheets

(56) References Cited

FOREIGN PATENT DOCUMENTS

| | | |
|---|---|---|
| JP | 2011160275 A | 8/2011 |
| WO | WO 2006/068114 A1 | 6/2006 |
| WO | 2010087229 A1 | 8/2010 |

OTHER PUBLICATIONS

Chinese Office Action dated Jan. 5, 2015, issued in counterpart Chinese Application No. 201210385424.5.

* cited by examiner

PIEZOELECTRIC
BODY INITIAL STATE
T0 (STATIONARY STATE)

PIEZOELECTRIC
BODY EXPANDS
T1

PIEZOELECTRIC BODY
INITIAL STATE
T2

PIEZOELECTRIC
BODY CONTRACTS
T3

PIEZOELECTRIC BODY
INITIAL STATE
T4

PIEZOELECTRIC
BODY EXPANDS
T5

PIEZOELECTRIC BODY
INITIAL STATE
T6

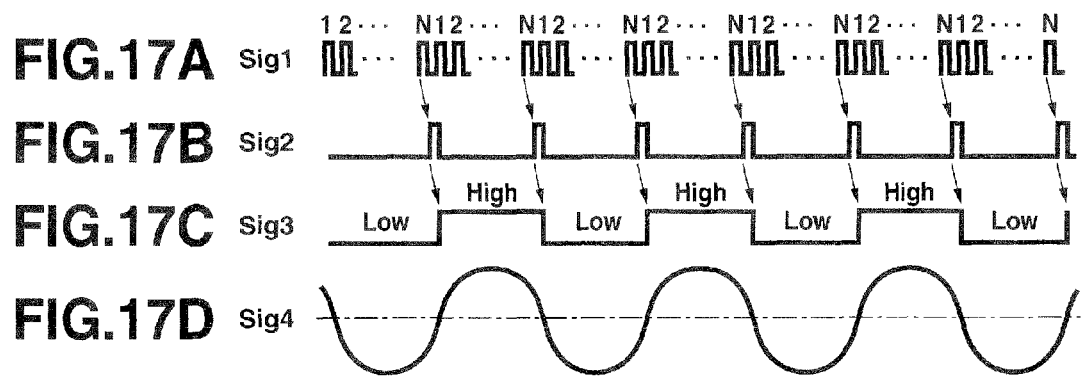
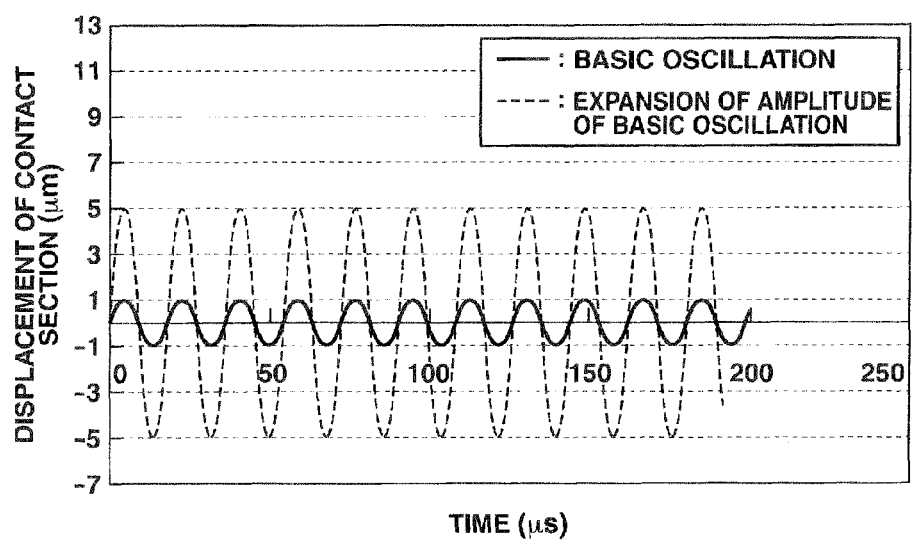
FIG. 18

OPERATION RING ROTATION ANGLE (°)

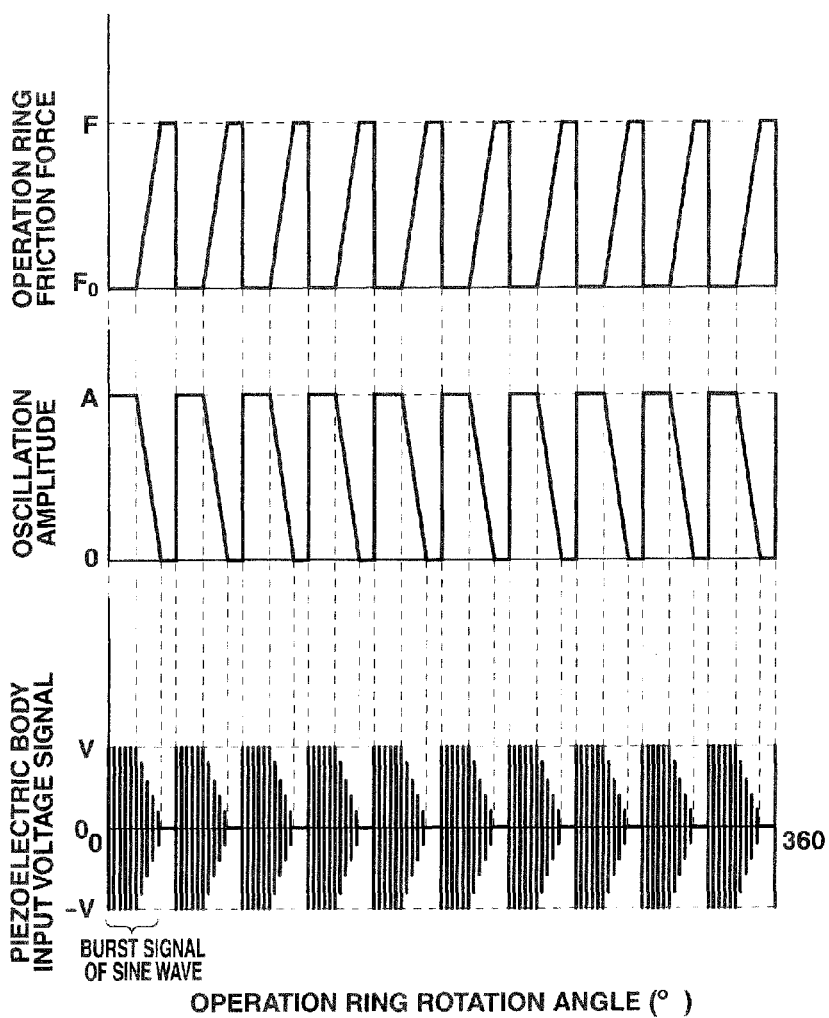

OPERATION DEVICE

This application claims the benefit of Japanese Applications No. 2011-224834 filed in Japan on Oct. 12, 2011, No. 2011-224835 filed in Japan on Oct. 12, 2011, and No. 2012-166495 filed in Japan on Jul. 27, 2012, the contents of which are incorporated herein by this reference.

BACKGROUND OF THE INVENTION

1. Field of the Invention

The present invention relates to an operation device that can give a sense of click to an operator who manually operates an operation member.

2. Description of the Related Art

An interchangeable lens digital camera is known that is able to perform a change of setting values of the camera besides focus adjustment through manual operation of a focus ring. In such a digital camera, a user can change the setting values of the camera by manually rotating the focus ring in a state in which specific buttons provided in a camera body are set in advance. As setting items of the camera, any one of setting items such as shutter speed, diaphragm, ISO sensitivity, white balance, and exposure correction is sequentially selected every time the user depresses the specific button in advance. Setting values of the selected setting items are changed according to manual rotation of the focus ring by the user. Display for informing the user of the change of the setting items or the setting values is also performed.

Concerning operability of the focus ring and other operation members incorporated in a lens barrel section of the lens unit, a technique is known that can change contact friction of an operation ring and increase and decrease a rotation operation force amount in a wide range by arranging a transducer of an ultrasound actuator and controlling the transducer (see Japanese Patent Application Laid-Open Publication No. 2005-316394).

A technique is also known that can carry out, in a reproducing system including a rotator section operated by a user, rotation regulation for a click form in the rotator section with rotation torque by an electric motor and cause the rotator section to oscillate with an oscillation motor or a piezoelectric element (see International Publication No. 2006/068114).

Further, a digital camera is also known that rotates, even in the case of a photographing state in which a user cannot look into the camera from an upper side and it is difficult to rotate a mode setting dial, in order to easily perform mode setting while checking a mode in display of an LCD monitor on a back of the camera, the mode setting dial according to pressing operation of a mode setting button on a back of a camera main body to switch a rotation position of the mode setting dial, i.e., a mode position and switches a mode of the camera on the basis of a mode position signal detected by a mode position detector (see Japanese Patent Application Laid-Open Publication No. 2005-257726).

SUMMARY OF THE INVENTION

An operation device according to the present invention includes: a fixed member; an operation member arranged to be manually rotatable with respect to the fixed member; load means arranged in the fixed member and for applying a predetermined load to the operation member when the operation member rotates; a transducer configured to come into friction contact with the load means in a state in which the transducer is pressed against the load means; position detecting means for detecting a relative position of the operation member with respect to the fixed member or the load means; operation mode setting means for setting an operation mode; and operation sense control means for controlling oscillation applied to the load means by the transducer thereby to change a sense of operation obtained from the operation member when the operation member is rotated. The operation sense control means causes, on the basis of an output from the position detecting means, the operation member to generate a sense of click corresponding to the set operation mode.

An operation device according to the present invention include: an operation member arranged to be manually rotatable with respect to a fixed member; load control means arranged in the fixed member and for controlling a load force amount when the operation member rotates; position detecting means for detecting a relative position of the operation member with respect to the fixed member or the load control means; operation mode selecting means for setting an operation mode; operation sense control means for controlling the load control means to give a sense of click to the operation member when the operation member is rotated in a position specified on the basis of an output from the position detecting means; display means for displaying a setting state of the operation mode selected by the operation mode setting means; and display changing means for changing contents displayed on the display means in association with rotation operation involving the sense of click of the operation member.

Benefits of the present invention will be further clarified from the following detailed explanation.

BRIEF DESCRIPTION OF THE DRAWINGS

FIG. 17A is a time chart showing a signal Sig1 outputted from a clock generator of a microcomputer for lens to an N-ary counter of a voltage control circuit in the piezoelectric body control circuit shown in FIG. 16;

FIG. 17B is a time chart showing a signal Sig2 outputted from the N-ary counter to a ½ frequency dividing circuit in the piezoelectric body control circuit shown in FIG. 16;

FIG. 17C is a time chart showing a signal Sig3 outputted from the ½ frequency dividing circuit to an inverter and a MOS transistor Q01 in the piezoelectric body control circuit shown in FIG. 16;

FIG. 17D is a time chart showing a signal Sig4 outputted from a secondary side of a transformer to the piezoelectric body in the piezoelectric body control circuit shown in FIG. 16;

FIG. 18 is a graph showing a state of displacement of a contact region at the time when oscillation amplitude is changed by the voltage control circuit;

FIG. 20A is a graph showing a modification of FIG. 19A;
FIG. 20B is a graph showing a modification of FIG. 19B;
FIG. 20C is a graph showing a modification of FIG. 19C;

DETAILED DESCRIPTION OF THE PREFERRED EMBODIMENTS

First Embodiment

First, a configuration of a digital camera to which an operation device according to a first embodiment of the present invention is applied is explained below mainly with reference to FIG. 1.

Figure 1:
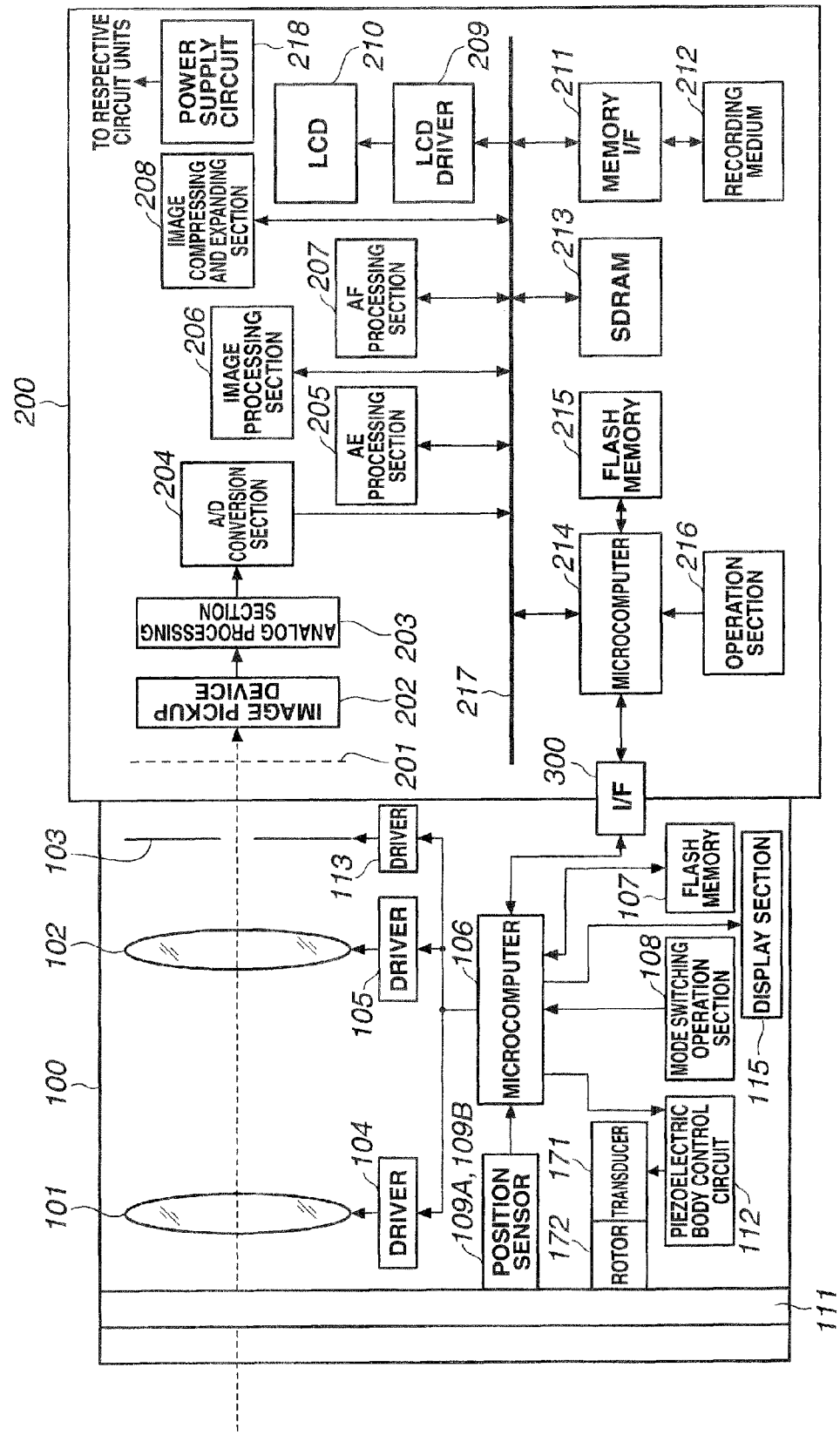
FIG. 1 is a block configuration diagram showing a configuration of a digital camera to which an operation device according to a first embodiment of the present invention is applied.

The digital camera shown in FIG. 1 includes an interchangeable lens barrel 100 and a camera main body 200, which are connected to be capable of communicating with each other via an interface (I/F) 300.

The interchangeable lens barrel 100 includes a focus lens 101, a zoom lens 102, a diaphragm mechanism 103, drivers 104, 105, and 113, a microcomputer for lens 106, a flash memory 107, a mode switching operation section 108, a position sensor 109 (A and B), a transducer 171, an operation ring 111, a piezoelectric body control circuit 112, a rotor 172, and a display section 115.

As explained in detail below, the position sensor 109 is a general term of a position sensor (position detecting means). The microcomputer for lens 106 and the microcomputer for main body 214 are examples of operation force amount control means (an operation force amount control section). Specifically, the position sensor 109 includes a rotation position detection sensor 109A that detects a rotation position of the operation ring 111 with respect to a fixed frame 122 and a slide start detection sensor 109B that detects that the operation ring 111 starts a slide with respect to the fixed frame 122.

The camera main body 200 includes a mechanical shutter 201, an image pickup device 202, an analog processing section 203, an analog/digital conversion section (hereinafter referred to as "A/D conversion section") 204, an AE processing section 205, an image processing section 206, an AF processing section 207, an image compressing and expanding section 208, an LCD driver 209, an LCD 210, a memory interface (hereinafter referred to as "memory I/F") 211, a recording medium 212, an SDRAM 213, the microcomputer for main body 214, a flash memory 215, an operation section 216, a bus 217, and a power supply circuit 218.

A detailed configuration of the interchangeable lens barrel 100 is explained.

The focus lens 101 condenses an optical image of an object on the image pickup device 202. The zoom lens 102 varies magnification of the optical image of the object. In the interchangeable lens barrel 100, naturally, the focus lens 101 may be configured to operate during a magnification varying operation for varying the magnification of the optical image.

The microcomputer for lens 106 is connected to the drivers 104, 105, and 113, the 300, the flash memory 107, the mode switching operation section 108, the position sensor 109, the piezoelectric body control circuit 112, and the display section 115.

The microcomputer for lens 106 performs reading and writing of information stored in the flash memory 107 and controls the drivers 104, 105, and 113 and the piezoelectric body control circuit 112.

The microcomputer for lens 106 communicates with the microcomputer for main body 214 via the I/F 300, transmits various kinds of information to the microcomputer for main body 214, and receives various kinds of information from the microcomputer for main body 214. For example, the microcomputer for lens 106 transmits information corresponding to an output signal of the mode switching operation section 108 and information corresponding to an output signal (a detection signal) of the position sensor 109 (the rotation position detection sensor 109A and the slide start detection sensor 109B) to the microcomputer for main body 214. For example, the microcomputer for lens 106 receives control information for the piezoelectric body control circuit 112 from the microcomputer for main body 214.

The microcomputer for lens 106 further controls the piezoelectric body control circuit 112 and the display section 115 on the basis of the control information received from the microcomputer for main body 214. Further, the microcomputer for lens 106 controls the piezoelectric body control circuit 112 and the display section 115 on the basis of an output signal of the mode switching operation section 108 and an output signal of the position sensor 109 (the rotation position detection sensor 109A and the slide start detection sensor 109B).

The driver 104 receives an instruction of the microcomputer for lens 106 and drives the focus lens 101 to perform a change of a focus position. The driver 105 receives an instruction of the microcomputer for lens 106 and drives the zoom lens 102 to perform a change of a focal length. The driver 113 receives an instruction of the microcomputer for lens 106 and drives the diaphragm mechanism 103. The diaphragm mechanism 103 is a mechanism unit for adjusting an amount of light of an object and an amount of blur of an object image.

The piezoelectric body control circuit 112 drives the transducer 171 (specifically, a piezoelectric body 171a (explained below) included in the transducer 171) under control by the microcomputer for lens 106.

The display section 115 is controlled by the microcomputer for lens 106 on the basis of position information of the rotation position detection sensor 109A, which detects a rotation position of the operation ring 111, and speed information calculated by the microcomputer for lens 106 from the position information.

The mode switching operation section 108 is an operation member for instructing a change of a role allocated to the operation ring 111, which is an operation member. Every time the mode switching operation section 108 is pressed, the microcomputer for lens 106 (or the microcomputer for main body 214) switches the operation ring 111 between two states: a state in which the operation ring 111 functions as a "mode switching" member and a state in which the operation ring 111 functions as a "setting value changing" member.

When the role of the operation ring 111 is "mode switching," the microcomputer for lens 106 (or the microcomputer for main body 214) sequentially switches setting of the operation mode of the operation ring 111 to any one of a focus mode, a zoom mode, a photographing mode, an ISO sensitivity mode, a shutter speed mode, a diaphragm mode, a white balance mode, and an art mode (ART-mode: an operation mode in which plural kinds of image processing for performing, for example, conversion of a photographed image into a monochrome image, a picture-like image, or the like). When the mode switching operation section 108 is depressed in a desired operation mode, a selected operation mode is fixed.

Simultaneously with the fixation of the operation mode, the role of the operation ring 111 is changed such that the operation ring 111 functions as an operation member for changing setting values in the fixed mode. For example, when the operation mode is fixed as a manual focus mode (hereinafter referred to as MF mode), which is one of focus modes, the operation ring 111 plays a role of a distance operation ring for adjusting a focus position.

As explained below in detail, the operation ring 111 is disposed to be fitted to, for example, an outer circumference of the interchangeable lens barrel 100 to be rotatable about an optical axis. The operation ring 111 is configured to be rotatable by manual operation by the user.

The operation ring 111 may be formed of a rotary dial member (a rotating ring shape member) or a slide lever member, which slides with respect to the fixed member, provided on the camera main body 200 side (the fixed member). In this case, if the operation member is provided on the camera main body 200 side, which is the fixed member, operation information of the operation member is inputted to and outputted from the microcomputer 106 on the interchangeable lens barrel 100 side through the I/F 300 according to necessity.

The transducer 171 receives a control signal from the piezoelectric body control circuit 112 and controls rotation resistance of the operation ring 111. In other words, the transducer 171 is controlled by the microcomputer for lens 106 via the piezoelectric body control circuit 112.

Specifically, the transducer 171 is frictionally coupled to the rotor 172, which is load control means and a rotating member, in a state in which the transducer 171 is pressed against the rotor 172. The transducer 171 receives a control signal from the piezoelectric body control circuit 112, which is operation sense control means, and oscillates. The piezoelectric body control circuit 112 is controlled by the microcomputer for lens 106 to control an oscillation state of the transducer 171 and control fictional coupling force with the rotor 172, i.e., rotation resistance force. Consequently, the piezoelectric body control circuit 112 controls rotation resistance force of the operation ring 111 coupled by a mechanism for transmitting rotation force to the rotor 172. As explained in detail below with reference to FIGS. 6 to 8 and the like, a configuration of the transducer 171 includes, for example, a laminated piezoelectric body (171a) and oscillating bodies (171c and 171d) configured integrally with the piezoelectric body.

The rotation position detection sensor 109A of the position sensor 109 detects a rotation amount and a rotating direction of the operation ring 111 and outputs a detection signal of the rotation amount and the rotating direction to the microcomputer for lens 106. As explained in detail below, the rotation position detection sensor 109A includes, for example, a GMR element (giant magneto-resistance element) provided to be opposed to a magnetic scale provided on an inner circumference side of the operation ring 111. Naturally, the position detecting mechanism does not need to be a magnetic type and may be an optical mechanism.

A schematic configuration of the camera main body 200 is explained.

The mechanical shutter 201 receives an instruction of the microcomputer for main body 214 to be driven and controls time for exposing an object image to the image pickup device 202.

The image pickup device 202 receives, in a photodiode forming a pixel, light condensed by the focus lens 101 and the zoom lens 102, photoelectrically converts the light, and outputs an amount of the light to the analog processing section 203 as a charge amount.

The image pickup device 202 is an image pickup device formed by arranging a color filter of a Bayer array on front surfaces of photodiodes forming pixels. The Bayer array includes a line on which R pixels and G (Gr) pixels are alternately arranged in a horizontal direction and a line on which G (Gb) pixels and B pixels are alternately arranged in the horizontal direction. The Bayer array is configured by alternately arranging the two lines in a vertical direction.

The image pickup device 202 may be an image pickup device of a CMOS type or a CCD type. The image pickup device 202 is not limited to the Bayer array. For example, an image pickup device of a stacked type or an image pickup device further including the analog processing section 203 and the A/D conversion section 204 explained below may be applied.

The analog processing section 203 applies, after reducing reset noise, waveform shaping to an electric signal (an analog image signal) read out from the image pickup device 202 and further applies gain-up processing to obtain target brightness.

The A/D conversion section 204 converts the analog image signal outputted from the analog processing section 203 into a digital image signal (hereinafter referred to as image data).

The bus 217 is a transfer path for transferring various data generated in the digital camera to the sections in the digital camera. The bus 217 is connected to the AE processing section 205, the image processing section 206, the AF processing section 207, the image compressing and expanding section 208, the LCD driver 209, the memory I/F 211, the SDRAM 213, and the microcomputer for main body 214.

Image data outputted from the A/D conversion section 204 is once stored in the SDRAM 213 via the bus 217.

The SDRAM 213 is a storing section in which various data such as image data obtained in the A/D conversion section 204 and image data processed in the image processing section 206 and the image compressing and expanding section 208 are temporarily stored.

The image processing section 206 applies various kinds of image processing to image data read out from the SDRAM 213. The image data subjected to the processing by the image processing section 206 is stored in the SDRAM 213.

The AF processing section 205 calculates object luminance from image data. Data for calculating the object luminance may be an output of an exclusive light measurement sensor. The AF processing section 207 extracts a signal of a high-frequency component from the image data and acquires a focusing evaluation value through AF (auto focus) integration processing.

The image compressing and expanding section 208 performs compression of image data by a predetermined compression system and expansion (decompression) of the image data compressed by the predetermined compression system. For example, if image data to be treated is a still image, the image compressing and expanding section 208 performs compression and expansion by a JPEG system or the like. If image data to be treated is a moving image, the image compressing and expanding section 208 performs compression and expansion by a Motion-JPEG system, an H.264 system, or the like. When image data related to a still image is recorded, the image compressing and expanding section 208 reads out image data from the SDRAM 213, compresses the read-out image data according to, for example, a JPEG compression system, and once stores compressed MEG image data in the SDRAM 213. The microcomputer for main body 214 which collectively controls various sequences of the camera main body 200 adds a JPEG header necessary for forming a JPEG file to the JPEG image data stored in the SDRAM 213 to create a JPEG file and records the created JPEG file in the recording medium 212 via the memory I/F 211. The recording medium 212 is, for example, a recording medium including a memory card detachably attachable to the camera main body 200. However, the recording medium 212 is not limited to this recording medium.

The LCD driver 209 causes the LCD 210 to display an image. The display of the image includes rec-view display processing for displaying image data immediately after photographing for a short time and display of a moving image such as reproduction display of the JPEG file recorded in the recording medium 212 and live view display. When the JPEG file recorded in the recording medium 212 is reproduced, the image compressing and expanding section 208 reads out the JPEG file recorded in the recording medium 212 and applies decompression processing (expansion processing) to the JPEG file and then causes the SDRAM 213 to once store the decompressed image data. The LCD driver 209 reads out the decompressed image data from the SDRAM 213 and converts the read-out image data into a video signal. Thereafter, the LCD driver 209 outputs the video signal to the LCD 210 and performs display of an image.

The microcomputer for main body 214 collectively controls various sequences of the camera main body 200. The operation section 216 and the flash memory 215 are connected to the microcomputer for main body 214.

The operation section 216 includes operation members such as a power button, a release button, a playback button, a menu button, a moving image button, and various input keys. When the user operates any one of the operation members of the operation section 216, the microcomputer for main body 216 executes various sequences corresponding to the operation by the user.

The power button is an operation member for performing instruction of turn-on and turn-off of a power supply for the digital camera. If the power button is pressed, the microcomputer for main body 214 turns on or off the power supply for the digital camera.

The release button includes two-stage switches: a first release switch and a second release switch. When the release button is half-pressed and the first release switch is turned on, the microcomputer for main body 214 performs a photographing preparation sequence for AE processing, AF processing, or the like. When the release button is fully pressed and the second release switch is turned on, the microcomputer for main body 214 executes a photographing sequence and performs photographing.

The playback button is an operation member for performing a playback instruction for a file recorded in the recording medium 212. When the playback button is pressed, the microcomputer for main body 214 executes a playback sequence and performs playback.

The menu button is an operation member for performing a display instruction for a menu for enabling a change of camera setting. When the menu button is pressed, the microcomputer for main body 214 executes a camera setting sequence and performs menu display or the like.

The moving image button is an operation member for performing a moving image photographing instruction. When the moving image button is pressed, the microcomputer for main body 214 executes a moving image photographing sequence and performs moving image photographing.

The flash memory 215 has stored therein, for example, various parameters necessary for operation of the digital camera such as a white balance gain corresponding to a white balance mode, a low-pass filter coefficient, and the like and a manufacturing number for specifying the digital still camera. The flash memory 215 has also stored therein various computer programs executed by the microcomputer 214. The microcomputer 214 executes respective kinds of processing according to a computer program stored in the flash memory 215 or by reading parameters necessary for various sequences from the flash memory 215.

In the camera main body 200 according to this embodiment, as shown in FIG. 1, the power supply circuit 218 for supplying electric power to the respective circuit units is shown. The power supply circuit 218 is controlled by the microcomputer for main body 214 to supply necessary electric power to the respective circuit units at necessary timing as appropriate. Further, the power supply circuit 218 can supply electric power to the respective circuit units of the interchangeable lens barrel 100 as well via the I/F 300. In that case, the microcomputer for main body 214 performs power supply control in cooperation with the microcomputer for lens 106.

A specific configuration example of the interchangeable lens barrel 100 in the digital camera is explained and a specific configuration example for realizing operability corresponding to an operation mode in the operation ring 111 is explained in detail below.

Figure 2:
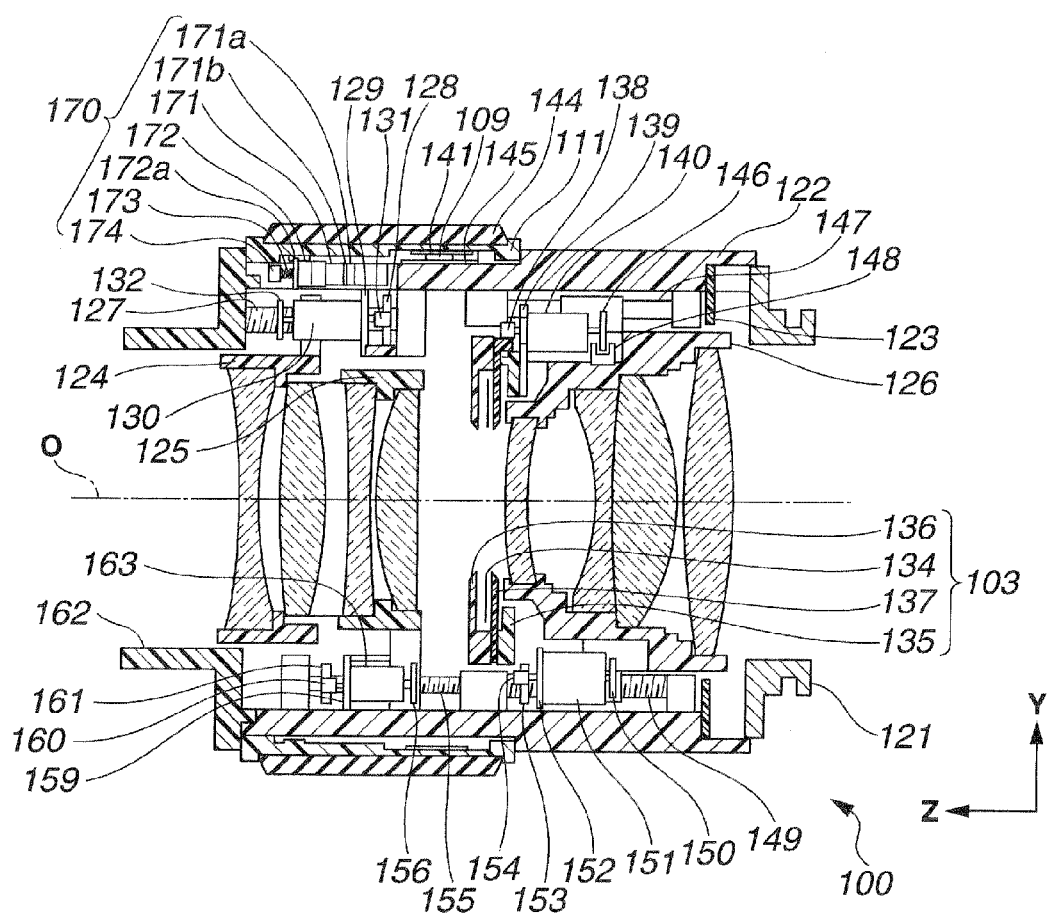
FIG. 2 is a sectional view showing a configuration of an interchangeable lens barrel in the digital camera shown in FIG. 1.
Figure 3:
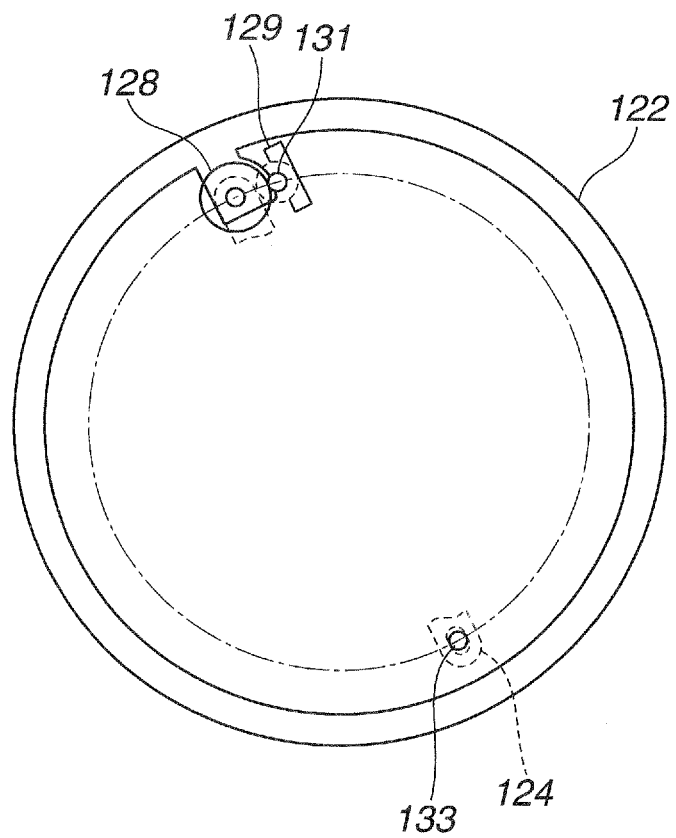
FIG. 3 is a diagram for explaining a mechanism for driving a first group frame of the interchangeable lens barrel shown in FIG. 2.

FIG. 2 is a sectional view showing an overview of the interchangeable lens barrel 100 forming a part of the digital camera according to this embodiment. FIG. 3 is a diagram for explaining a mechanism for driving a first group frame 124 of the lens barrel shown in FIG. 2 and is a diagram of main components of the mechanism viewed from the object side. The object side of the interchangeable lens barrel 100 is referred to as front and the camera main body side is referred to as rear.

The interchangeable lens barrel 100 includes the first group frame 124 that holds two lenses from the front, a second group frame 125 that holds the next two lenses, and a third group frame 126 that holds the remaining four lenses and holds the diaphragm mechanism 103.

A so-called bayonet type mount member 121 for attachment to the camera main body 200 is provided at a rear end of the interchangeable lens barrel 100. The mount member 121 is fixed to the fixed frame 122 by screws or the like. A not-shown electric signal terminal is provided in the mount member 121. When the interchangeable lens barrel 100 is mounted on the camera main body 200, the interchangeable lens barrel 100 is electrically connected to an electric hoard 123. Electric communication and power supply are performed between the camera main body 200 and the interchangeable lens barrel 100.

Each of driving mechanisms in the first group frame 124, the second group frame 125, and the third group frame 126 includes the same mechanism. Therefore, only the driving mechanism for the first group frame 124 is explained below.

In outer circumferences of the first group frame 124 and the second group frame 125, a shaft-like first group feed screw 127, on which a lead screw is formed, is arranged in parallel to an optical axis O and to be pivotable about an axis of the optical axis O. One end of the first group feed screw 127 is fitted in a hole (the camera main body side) of an inner circumferential side projecting portion of the fixed frame 122. The other end of the first group feed screw 127 is fitted in a hole (the object side) of a front fixed frame 162 fixed to the fixed frame 122. A first group screw gear 128 is firmly fixed to a rear end of the first group feed screw 127 by caulking, press-fitting, or the like.

A first group motor 130 integral with a first motor table 129 having a tabular shape is fixed to another projecting portion of the fixed frame 122 by screws or the like. A first group motor gear 131 is fixed to one end of a rotating shaft of the first group motor 130 by press-fitting or the like. The first group screw gear 128 meshes with the first group motor gear 131. A first group position detection vane 132, in which plural slits are provided radially with respect to a center of the rotating shaft, is fixed to the other end of the rotating shaft of the first group motor 130 by press-fitting or the like.

A female screw that fits with the first group feed screw 127 is formed in a projection (not shown in the figure) provided on an outer circumference side of the first group frame 124. A first group guide shaft 133 (not shown in FIG. 2), both ends of which are fixed to a projecting portion on the inner circumference side of the fixed frame 122, set in parallel to the optical axis O is held on an opposite side (see FIG. 3) of a setting position of the first group feed screw 127 with respect to the optical axis O. The first group guide shaft 133 fits in a long hole formed in the projection provided on the outer circumference of the first group frame 124 and extending in a radial direction with respect to the optical axis O. The first group guide shaft 133 is positioned in the fixed frame 122 and held by screw fitting with the first group feed screw 127.

Operation of the first group frame 124 is explained. When the first group motor 130 is rotated, the first group screw gear 128 meshing with the first group motor gear 131 rotates and the first group feed screw 127 integral with the first group screw gear 128 rotates. Then, force for rotation about the rotating shaft of the first group feed screw 127 acts on the first group frame 124 meshing with the first group feed screw 127. However, since the rotation of the first group frame 124 is stopped by the first group guide shaft 133, the first group frame 124 moves in a direction of the optical axis O by a screw pitch of the first group feed screw 127 according to one rotation of the first group feed screw 127. At this point, the first group feed screw 127 and the first group guide shaft 133 are respectively pressed by not-shown screws or the like. Consequently, a backlash caused in a portion of the first group feed screw 127 and a backlash caused in a portion of the first group guide shaft 133 are suppressed. Therefore, the rotation of the first group motor 130 is surely transmitted to the first group frame 124. With such a configuration, it is possible to accurately detect a position of the first group frame 124 by detecting the rotation of the motor shaft with the first group position detection vane 132 attached to the other end of the motor shaft.

The diaphragm mechanism 103 includes diaphragm vanes 134, a diaphragm table 135 rotatable around the optical axis, a diaphragm plate 137 held by a diaphragm cap 136, and a mechanism of a cam and a pin provided between the diaphragm plate 137 and the plural diaphragm vanes 134. With this mechanism, when the diaphragm plate 137 rotates, the plural diaphragm vanes 134 simultaneously operate along the cam and form a so-called iris diaphragm for stopping down an opening of the diaphragm cap 136. A gear is provided in an outer circumference side projecting portion of the diaphragm plate 137. A diaphragm motor gear 138 attached to one end of the motor shaft meshes with the gear.

Therefore, when a diaphragm motor 140 attached to the diaphragm table 135 via a diaphragm motor table 139 rotates, the diaphragm motor gear 138 rotates and driving force of the rotation is transmitted to the diaphragm plate 137. The diaphragm plate 137 rotates. According to the rotation of the diaphragm plate 137, the plural diaphragm vanes 134 simultaneously move along the cam to form a so-called iris diaphragm for stopping down an opening of the diaphragm cap 136. A size of the iris diaphragm formed by the diaphragm vanes 134 can be changed.

The operation ring 111 is explained.

The operation ring 111 fits in an outer circumference of the fixed frame 122 to be rotatable about the optical axis. A cylindrical scale 141 is provided on the inner circumference side of the operation ring 111. The scale 141 is a magnetic scale in which N poles and S poles are alternately arranged in a belt shape (a width direction of the belt is the optical axis direction) in a circumferential direction at an equal pitch. A position sensor 109 is provided on the outer circumference of the fixed frame 122 to be opposed to the scale 141. The position sensor 109 is the rotation position detection sensor 109A for detecting a rotation position of the operation ring 111 and is, for example, a GMR element (giant magneto-resistance element). Resistance of the position sensor 109 changes according to a change in a magnetic field of the scale 141. The position sensor 109 outputs a relative position change relative to the scale 141 as fluctuation in a voltage signal. It is possible to manually control the frames by controlling the motors according to this electric signal. Manual or automatic (e.g., autofocus) can be set by operation of an operation member (not shown in FIG. 2) included in the operation section 216 of the camera main body 200. Alternatively, it is also possible to provide an operation member such as a button, a lever, or a dial in the interchangeable lens barrel 100 and set the manual or automatic by operating the operation member.

The motors and the rotation position detection sensor 109A are electrically connected to the electric board 123, on which main circuits of a photographing lens are mounted, through a flexible printed board 145 and controlled by the microcomputer for lens 106 mounted on the electric board 123.

The motors explained above are rotating electromagnetic motors. However, piezoelectric motors including piezoelectric bodies may be used or linear motors that directly operate in the optical axis direction may be used. If stepping motors are used as the motors, position detectors for the motors are unnecessary.

For detection of positions of the frames, a method of detecting, with a photointerrupter, position detection vanes attached to the motors is adopted. However, for example, a magnetic detection system employing GMR or a Hall element may be adopted or an electrostatic system for detecting a change in capacitance may be adopted. Further, a method of directly detecting movement of the frames rather than detecting the rotation of the motors may be adopted. Although not described herein, if a position detector for detecting an origin position of a position is set and operation for checking the origin position in a predetermined state is performed, it is possible to perform the position detection more accurately. Concerning position detection for the operation ring 111, an optical detector may be used or an electrostatic detector may be used rather than a magnetic detector.

A configuration of a load control mechanism 170 including the transducer 171 that generates a sense of click in synchronization with rotation of the operation ring 111 when the user operates the operation ring 111, which is a manual operation member, to perform, for example, changes of setting items and setting values is explained below.

Figure 4:
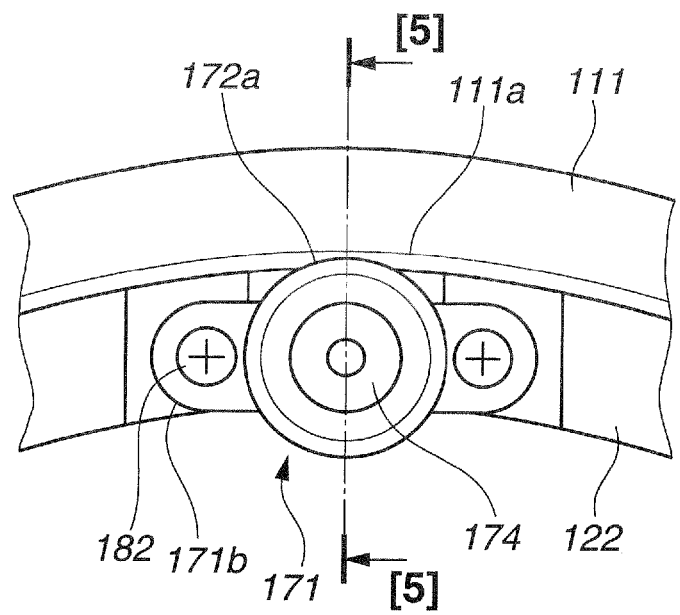
FIG. 4 is a diagram for explaining a load control mechanism attached to a fixed frame of the interchangeable lens barrel shown in FIG. 2.
Figure 5:
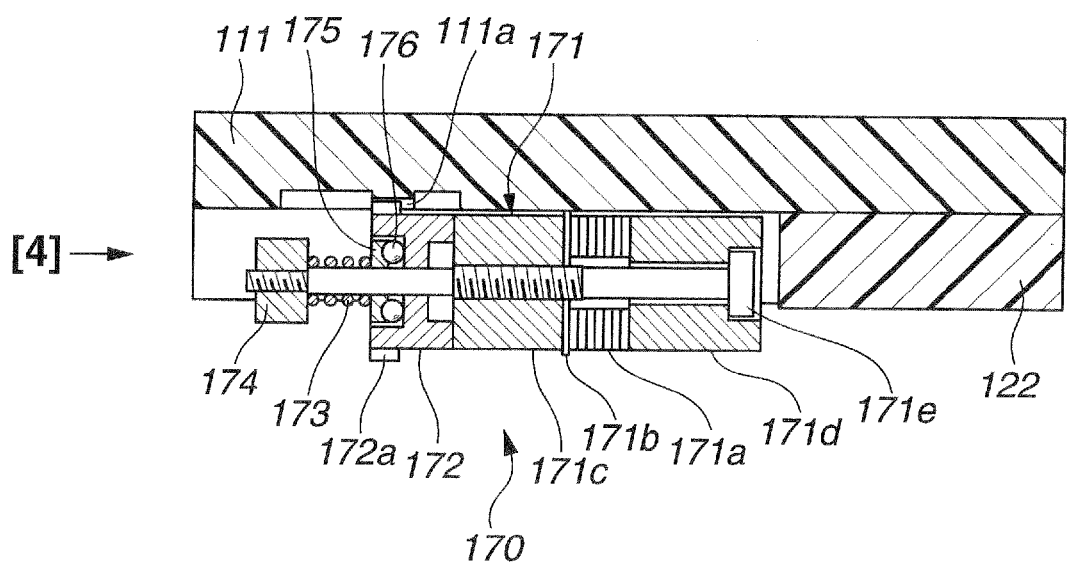
FIG. 5 is a sectional view taken along a line [5]-[5] in FIG. 4.

FIG. 4 is a diagram showing a state in which the load control mechanism 170 shown in FIG. 2 is attached to the fixed frame 122. FIG. 5 is a diagram showing a detailed configuration of the load control mechanism 170.

In FIG. 4, the transducer 171 included in the load control mechanism 170 is fixed to the fixed frame 122 by screws 182 via a fixed plate 171b. As explained in detail with reference to FIG. 5, in the rotor 172 included in the load control mechanism 170 and functioning as the load control means, a gear 172a that meshes with an internal gear 111a of the operation ring 111 is provided.

In FIG. 5, the transducer 171 caused to oscillate at predetermined timing to control rotation resistance force of the operation ring ill is formed in a cylindrical shape obtained by placing the stacked piezoelectric bodies 171a respectively having holes in centers and the tabular fixed plate 171b one on top of the other in a plate thickness direction and holding the piezoelectric bodies 171a and the fixed plate 171b with an oscillating body A 171c and an oscillating body B 171d. The piezoelectric bodies 171a and the fixed plate 171b, which are held between the oscillating body A 171c and the oscillating body B 171d, and the oscillating body B 171d are screw-fit in and press-fit and fixed to the oscillating body A 171c by a bolt 171e.

The rotor 172 included in the load control mechanism 170 is the load control means. The rotor 172 rotatably fits with a shaft portion extended from an intermediate screw fitting portion of the bolt 171e. One end face of the rotor 172 is in contact with an outer side end face of the oscillating body A 171c and the other end of the rotor 172 is pressed by a spring 173. A recess in which balls 176 and a bearing 175 are arranged is formed at the other end. The bearing 175 arranged in the recess is processed by the spring 173. A screw is formed at a distal end of the bolt 171e. A nut 174 is screwed with the screw and compresses the spring 173 to thereby press the bearing 175.

In a contact portion of the rotor 172 and the oscillating body A 171c, when a coefficient of friction of the contact portion is represented as μ and pressing force of the spring 173 is represented as Fp, friction force F=μ×Fp is generated. The friction force F is transmitted to the operation ring 111 meshed with the rotor 172 by a gear and applies an operation load to the operation ring 111. Although not shown in the figure, the transducer 171 is screwed to the fixed frame 122 via the fixed plate 171b. The fixed plate 171b is arranged in a node for vertical oscillation in the transducer 171 not to hinder oscillation of the transducer 171.

In a state in which a voltage is not applied to the piezoelectric body 171a, large friction force is generated in the contact portion of the rotor 172 and the oscillating body A 171c to keep relative positions of the operation ring 111 and the fixed frame 122. Therefore, for example, when the operation ring 111 is not manually operated, it is also possible to set the transducer 171 in a non-driven state and fix and hold the operation ring 111 with friction contact force.

When a frequency voltage is generated in the piezoelectric bodies 171a, the transducer 171 moves in a direction parallel to the optical axis O of the interchangeable lens barrel 100 and reduces the friction force in the contact portion of the rotor 172 and the oscillating body A 171c. When supply of the frequency voltage to the piezoelectric bodies 171a is stopped, friction force is generated between the rotor 172 and the oscillating body A 171c. An operation force amount of the operation ring 111 meshed with the rotor 172 by the gear increases to be extremely large and resistance increases. Therefore, it is possible to generate a sense of click in the operation ring 111 by repeating the supply and the stop of the frequency voltage. The friction force equivalent to a click force amount, which is resistance force, can change oscillation amplitude of the transducer 171 by controlling a voltage applied to the piezoelectric body 171a. The click force amount can also be controlled. When a frequency of the frequency voltage is set to a predetermined value, the transducer 171 can resonate and generate extremely large oscillation amplitude. The friction force can be reduced to be extremely small. At this point, the oscillation amplitude can be changed by slightly changing the frequency from a resonant frequency. The friction force can also be changed by changing the frequency.

In FIG. 2, other reference numerals denote members as explained below. Reference numeral 144 denotes rubber provided in the operation ring 111 as slip resistance. Reference numeral 146 denotes a diaphragm position detection vane. Reference numeral 147 denotes a third group guide shaft. Reference numeral 148 denotes a diaphragm position detector. Reference numeral 149 denotes a third group feed screw. Reference numeral 150 denotes a third groups detection vane. Reference numeral 151 denotes a third group motor. Reference numeral 152 denotes a third group motor table. Reference numeral 153 denotes a third group screw gear. Reference numeral 154 denotes a third group motor gear. Reference numeral 155 denotes a second group feed screw. Reference numeral 156 denotes a second group position detection vane. Reference numeral 157 denotes balls. Reference numeral 158 denotes a spring. Reference numeral 159 denotes a second group motor table. Reference numeral 160 denotes a second group motor gear. Reference numeral 161 denotes a second group screw gear. Reference numeral 162 denotes a front fixed frame. Reference numeral 163 denotes a second group motor.

Figure 6:
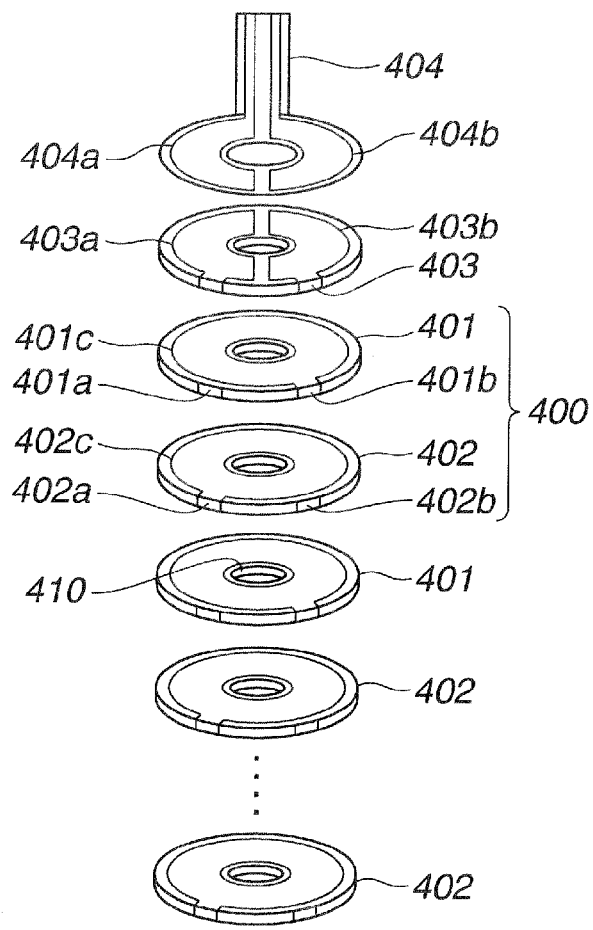
FIG. 6 is an exploded perspective view showing a schematic configuration of a piezoelectric body that forms a transducer in the interchangeable lens barrel shown in FIG. 2.
Figure 7:
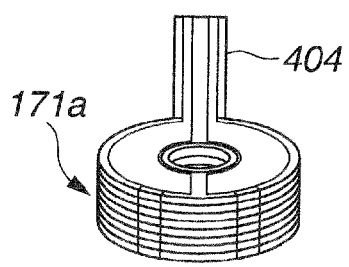
FIG. 7 is an assembly diagram showing a schematic configuration of the piezoelectric body shown in FIG. 6.

FIG. 6 is an exploded perspective view for explaining a specific configuration of the piezoelectric body 171a included in the transducer 171. FIG. 7 is a diagram showing a state in which the transducer 171 is assembled.

As shown in FIG. 6, the piezoelectric body 171a includes a stacked piezoelectric body formed by stacking multiple piezoelectric body single plates having a circular plate shape made of piezoelectric ceramics such as lead titanate zirconate. As a basic configuration (reference numeral 400), a circular tabular piezoelectric body plate A 401 (a first tabular piezoelectric body) having predetermined thickness, in a center of which an attachment hole 410 is formed, and a circular tabular piezoelectric body plate B 402 (a second tabular piezoelectric body) having predetermined thickness, in a center of which the same hole 410 is formed, form a pair to be formed as a set of unit (400). A plurality of the units (400) are stacked. The attachment hole 410 is a hole for holding the piezoelectric body 171a with the oscillating body A 171c and the oscillating body B 171d and fixing the piezoelectric body 171a with the bolt 171e.

In the circular tabular piezoelectric body plate A 401 having the predetermined thickness, a circular electrode C 401c (a surface electrode), a rectangular tabular side electrode 1B (401b), and a rectangular tabular side electrode 1A (401a) are formed. The circular electrode C 401c is printed on a surface on one side of the circular tabular piezoelectric body plate A 401. File rectangular tabular side electrode 1B (401b) is electrically coupled to and printed in a position extending from the circular electrode C 401c to a side of the piezoelectric body plate A 401. The rectangular tabular side electrode 1A (401a) is electrically insulated from the circular electrode C (401c) and the side electrode 1B (401b) and printed on a side of the circular tabular piezoelectric body plate A 401, which is a side portion different from the side electrode 1B (401b).

In the circular tabular piezoelectric body plate B 402 having the predetermined thickness, a circular electrode C 402c (a surface electrode), a rectangular tabular side electrode 2A (402a), and a rectangular tabular side electrode 2B (402b) are formed. The circular electrode C 402c is printed on a surface on one side of the circular tabular piezoelectric body plate B 402. The rectangular tabular side electrode 2A (402a) is electrically coupled to and printed in a position extending from the circular electrode C 402c to a side of the piezoelectric body plate B 402, which is a position extending to aside portion corresponding to the side electrode 1A (401a). The rectangular tabular side electrode 2B (402b) is electrically insulated from the circular electrode C (402c) and the side electrode 2A (402a) and printed on a side of the circular tabular piezoelectric body plate B 402 corresponding to the side electrode 1B (401b), which is a side portion different the side electrode 1B (401b).

The piezoelectric body plate A 401 and the piezoelectric body plate B 402 are stacked such that a surface of the piezoelectric body plate A 401 on which the circular electrode C 401c is not printed and a surface of the piezoelectric body plate B 402 on which the circular electrode C 402c is printed are opposed to each other. Further, as shown in FIG. 7, the piezoelectric body plate A 401 and the piezoelectric body plate B 402 are stacked such that the side electrode 1A (401a) and the side electrode 2A (402a) are linearly located and the side electrode 1B (401b) and the side electrode 2B (402b) are linearly located in a row.

Therefore, when the piezoelectric body plates are stacked, the stacked piezoelectric body plates are alternately connected to the circular electrodes (401c and 402c) by the electrodes 1A and 2A and the electrodes 1B and 2B formed on the side.

As shown in FIG. 6, an electrode plate 403 is disposed on a surface on an outermost side of the piezoelectric body 171a. On a surface of the electrode plate 403, two semicircular electrodes are formed to be symmetrical with respect to the attachment hole 410. Reference sign 403a denotes an electrode A of the electrode plate 403. A side electrode in contact with the side electrode 1A (401a) is arranged on a side portion of the electrode A 403a. Reference numeral 403b denotes an electrode B of the electrode plate 403. A side electrode in contact with the side electrode 1B (401b) is arranged on a side portion of the electrode B 403b.

The flexible printed board 404 in which the attachment hole 410 is provided is connected to the electrodes A and B of the electrode plate 403 that is formed of ceramics but does not have piezoelectric action. The circuit pattern A 404a of the flexible printed board 404 having a shape same as the electrode A is connected to the electrode A. The circuit pattern B 404b of the flexible printed board 404 having a shape same as the electrode B is connected to the electrode B.

In FIG. 6, the plural piezoelectric body single plates are stacked to form the piezoelectric body 171a. However, the same configuration can also be obtained by manufacturing the piezoelectric body 171a in a form in which the piezoelectric body single plates are folded.

FIG. 7 shows the piezoelectric body 171a obtained by stacking and sinter-forming the plural piezoelectric body single plates, which have the attachment hole 410 and on which the circular electrode C 401c and the circular electrode C 402c are alternately printed, and, after baking and printing two electrodes on a surface of a side of the piezoelectric body single plates and polarizing the electrodes, conductively joining the flexible printed board 404 to an external electrode. After circular tabular piezoelectric body single plates without a hole are stacked and sinter-formed, a hole may be opened in a center of the piezoelectric body single plates by cutting.

Figure 8:
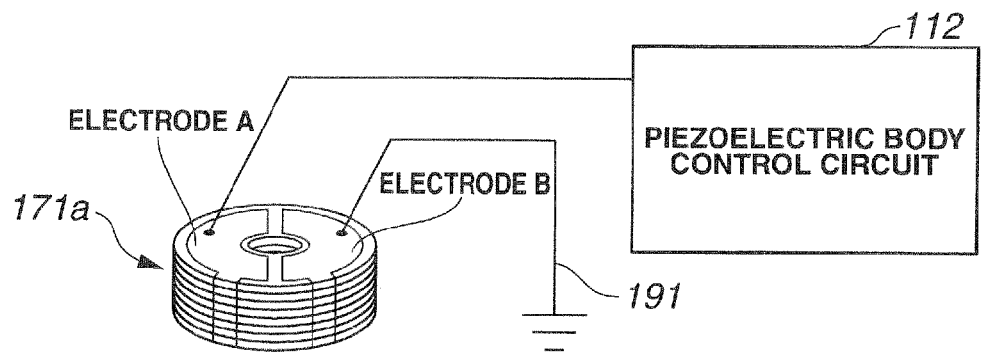
FIG. 8 is a connection concept diagram of the piezoelectric body shown in FIG. 7 and a piezoelectric body control circuit that applies a voltage to the piezoelectric body.

In the stacked piezoelectric body formed in this way, by applying a high voltage between the electrode A (1A and 2A) and the electrode B (1B and 2B), the electrodes A and B are polarized in the same direction in a plate thickness direction. Therefore, as shown in FIG. 8 indicating a concept of voltage application to the piezoelectric body, one of the polarized electrode A and electrode B of the piezoelectric body 171a is connected to aground 191 of the piezoelectric body control circuit 112 and a signal output terminal of the piezoelectric body control circuit 112 is connected to the other to apply a frequency voltage to the piezoelectric body 171a. Then, the piezoelectric body 171a expands and contracts in the plate thickness direction.

A modification concerning the piezoelectric body (see FIGS. 6 to 8) in this embodiment is explained below with reference to FIGS. 9 and 10.

Figure 9:
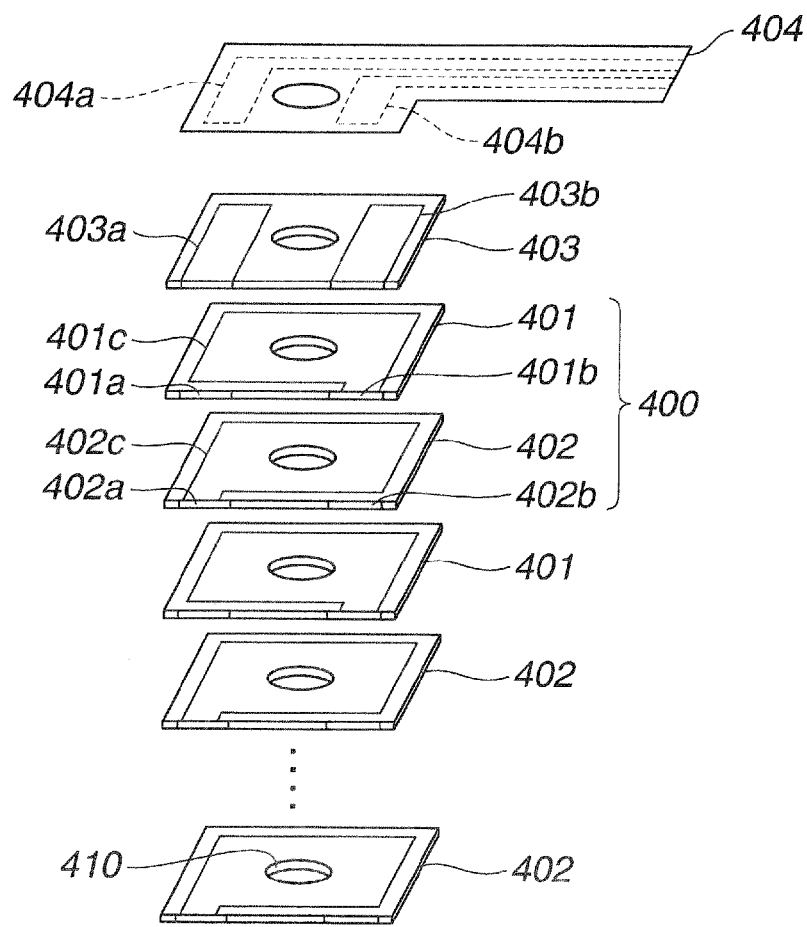
FIG. 9 is an exploded perspective view showing a modification of the piezoelectric body shown in FIG. 6.
Figure 10:
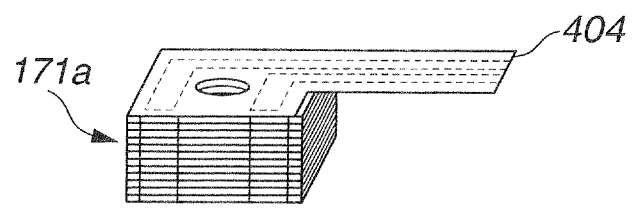
FIG. 10 is a piezoelectric body assembly diagram of the modification shown in FIG. 9.

FIGS. 9 and 10 are diagrams respectively corresponding to FIGS. 6 and 7. A piezoelectric body shown in FIGS. 9 and 10 is substantially different from the piezoelectric body shown in FIGS. 6 to 7 in that a shape of piezoelectric body plates is changed from a circular shape to a rectangular shape. Accordingly, the circular electrode is changed to a rectangular electrode having an attachment hole. Further, a shape of the flexible printed board 404 and an electrode shape of an electrode plate C arranged on an outermost side are changed from the semicircular shape to a rectangular shape.

As explained above, in this modification (FIGS. 9 and 10), the circular electrode shown in FIG. 6 is changed to the rectangular shape. However, in FIG. 9, components having functions same as those of the components explained with reference to FIG. 6 are denoted by the same reference numerals and signs and explained.

In this modification, the shape of the piezoelectric body plates A and B is rectangular (oblong). However, the piezoelectric body plates A and B only have to be angular at ends and may be formed in a square shape or a polygonal shape. When the shape of the stacked piezoelectric body is changed from circular to square, plural piezoelectric bodies can be sliced from one piece of piezoelectric ceramics. Therefore, slicing efficiency is improved. This is advantageous in terms of cost.

A modification in which the piezoelectric body explained in the modification explained above (FIGS. 9 and 10) is applied to the (transducer of) the load control mechanism is explained below with reference to FIGS. 11, 12, and 13.

Figure 11:
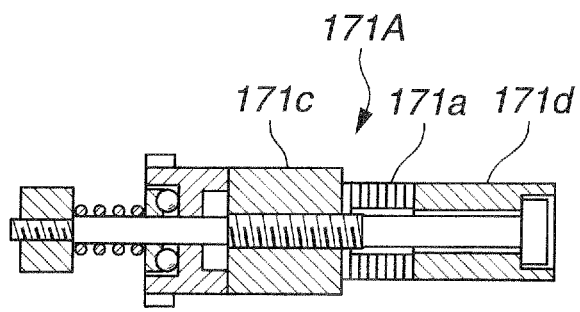
FIG. 11 is a sectional view showing a schematic configuration of a modification of the transducer applied to the lens barrel shown in FIG. 2.

FIG. 11 is a sectional view of a modification of the transducer (171) applied to a load control mechanism (171A) in this embodiment. FIG. 12 is an external view of the transducer. FIG. 13 is a diagram showing an attached state of the transducer. In the following explanation, only differences from the transducer applied to the load control mechanism (see FIG. 5) in this embodiment are explained. Components corresponding to those in this embodiment are denoted by the same reference numerals and signs and explained.

Figure 12:
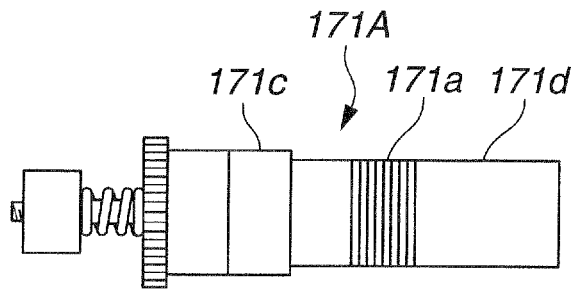
FIG. 12 is an external view of the transducer of the modification shown in FIG. 11.
Figure 13:
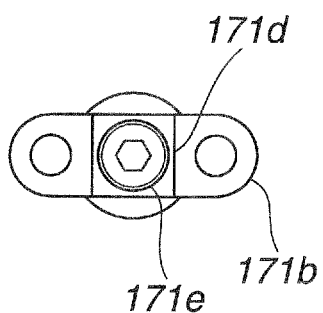
FIG. 13 is a diagram showing an attachment state of the transducer of the modification shown in FIG. 11.

As it is evident from the external view of FIG. 12, in the transducer 171A in this modification, a shape of the oscillating body A 171c is substantially different from that in this embodiment. Specifically, a side of the oscillating body A 171c in contact with the rotor 172 is a cylinder. A side of the oscillating body A 171c in contact with the piezoelectric body 171a is a prism. In a center of the oscillating body A 171c, a hole through which the bolt 171e is inserted is opened. Further, the piezoelectric body 171a and the oscillating body B 171d are also formed in shapes corresponding to the prism of the oscillating body A 171c.

Since a rear end side of the transducer 171 is formed as the prism in this way, the transducer 171 can be formed small. An arrangement space for the flexible printed board 404 extending from the piezoelectric body 171a can be secured. The stacked piezoelectric body having the square external shape can be manufactured by printing plural electrodes on one large plate of a piezoelectric body, a plurality of the stacked plates on which the plural electrodes are printed are sintered, and cutting the sintered stacked plates. Therefore, there is an effect that a large quantity of piezoelectric bodies can be easily manufactured. Further, since square piezoelectric bodies of the same shape are stacked, when the bolt 171e is rotated and tightened, it is easy to hold the oscillating body A 171c and the oscillating body B 171d not to rotate.

A mechanism for control of friction acting between contact portions of the oscillating body A 171c and the rotor 172 shown in FIGS. 4 and 5, in particular, a friction reduction is explained below with reference to FIGS. 14A, 14B, 14C, 14D, 14E, 14F, and 14G showing, for each predetermined time, a state of a transducer and a rotor driven by applying a predetermined frequency voltage to a piezoelectric body. A frequency voltage inputted to the piezoelectric body 171a included in the transducer 171 (an input voltage in changing the piezoelectric body 171a) is shown in FIG. 15.

Figure 14A:
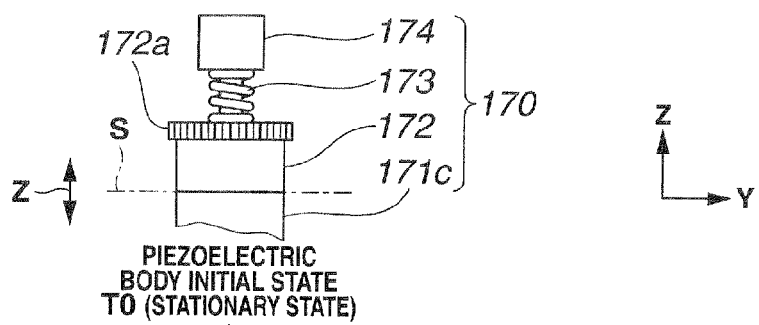
FIG. 14A is a diagram showing a state in which the transducer and a rotor are in an initial state (a stationary state) among states of the transducer and the rotor in applying a frequency voltage to the piezoelectric body shown in FIG. 8 to cause the piezoelectric body to oscillate.
Figure 15:
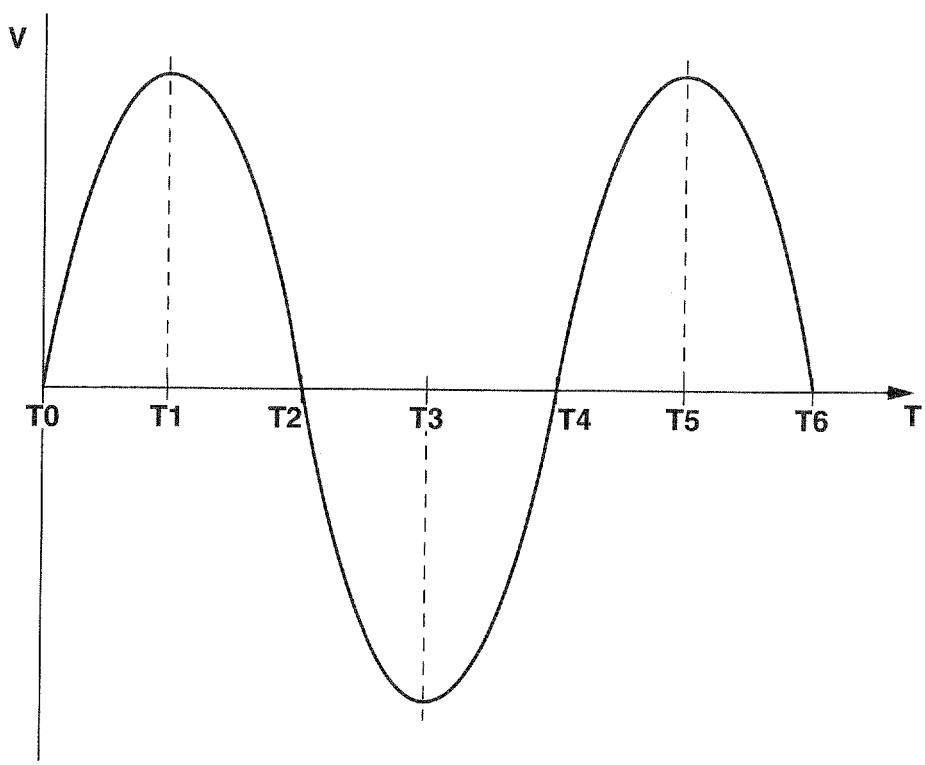
FIG. 15 is a graph showing a change with time of the frequency voltage applied to the piezoelectric body shown in FIG. 8.

As shown in FIG. 14A, in an initial state of the piezoelectric body, the rotor 172 in which the gear 172a is formed is pressed in a direction of the oscillating body A 171c by a spring 173. The rotor 172 and the oscillating body A 171c are in friction contact with each other. Pressing force applied to the oscillating body A 171c is adjusted by adjusting a tightening position of a nut 174 that meshes with the bolt 171e.

In the example explained above, a compression coil spring is used for the adjustment of the pressing force. However, a disc spring or the like may be used. Any mechanism can be used as long as the mechanism can generate pressure between the oscillating body A 171c and the rotor 172 such as magnetic force by a magnet.

As a material of the oscillating body A 171c, metal, ceramics, or the like having high rigidity is desirable. As a material of the rotor 172 in contact with the oscillating body A 171c, it is desirable to use metal, ceramics, or the like having high rigidity and abrasion resistance. To suppress occurrence of audible sound, it is advisable to form the rotor 172 with a material obtained by kneading carbon fiber, glass fiber, or ceramic powder in resin such as PPS.

FIG. 15 is a diagram showing, in a relation with a frequency voltage (an input voltage in changing the piezoelectric body 171a) in each predetermined time, states of the rotor 172 and the oscillating body A 171c included in the transducer 171 in FIGS. 14A, 14B, 14C, 14D, 14E, 14F, and 14G explained below. Specifically, voltage signals applied to the piezoelectric body 117a corresponding to time T0 in FIG. 14A to time T6 in FIG. 14G as state changes that occur when a frequency voltage is applied to the piezoelectric body 171a having the configuration shown in FIG. 8 to cause the piezoelectric body 171a to oscillate.

In an initial state (FIG. 14A and T0 in FIG. 15) in which a voltage is not applied to the piezoelectric body 171a, the rotor 172 is pressed against the oscillating body A 171c by pressing force of the spring 173 and is in contact with the oscillating body A 171c.

The piezoelectric body 171a is caused to oscillate to generate acceleration in a several tens of thousands m/s² level due to ultrasound oscillation on an end face of the oscillating body A 171c included in an end of the transducer 171.

When a voltage having a predetermined frequency equal o or higher than 20 kHz of a sine wave is applied to the piezoelectric body 171a, ultrasound oscillation of about 1 μm occurs on a contact surface of the rotor 172 and the oscillating body A 171c. The rotor 172 rises from the oscillating body A 171c and hardly comes into contact with the oscillating body A 171c.

Figure 14B:
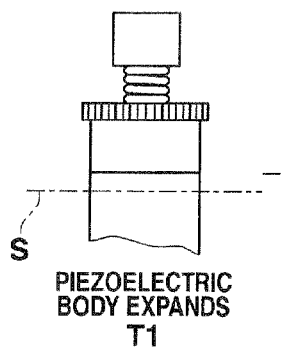
FIG. 14B is a diagram showing a state in which a maximum voltage is applied to the piezoelectric body and the piezoelectric body expands to the maximum after the state shown in FIG. 14A.

When a voltage is applied to the piezoelectric body 171a such that the piezoelectric body 171a extends, the oscillating body A 171c is pressed by the rotor 172 in astute in which force of a product of acceleration of displacement of the piezoelectric body and mass of the transducer 171 is applied to the oscillating body A 171c anew. The displacement acceleration gradually decreases to zero. A maximum voltage is applied to the piezoelectric body 171a. The piezoelectric body 171a expands to the maximum (FIG. 14B and T1 in FIG. 15). When generated acceleration in an initial period is extremely large, depending on conditions, the oscillating body A 171c does not come into contact with the rotor 172 in this state.

Figure 14C:
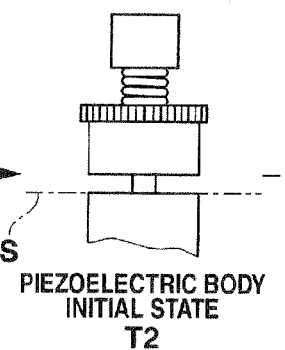
FIG. 14C is a diagram showing a state in which the piezoelectric body contracts and returns to the initial state after the state shown in FIG. 14B (after maximum deformation)

After being deformed to the maximum, the piezoelectric body 171a starts to contract and returns to the initial state. At this point, the spring 173 cannot sufficiently draw back displacement due to the acceleration generated by the piezoelectric body 171a (a response delay occurs because the piezoelectric body 171a has a small time constant but the spring 173 has a relatively extremely large time constant). Therefore, a state in which the oscillating body A 171c does not come into contact with the rotor 172 is realized (FIG. 14C and T2 in FIG. 15).

Figure 14D:
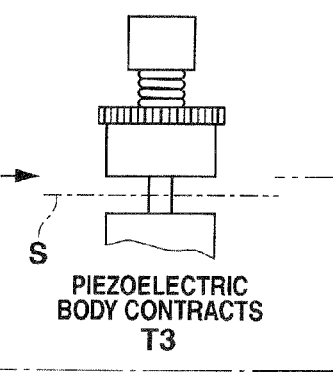
FIG. 14D is a diagram showing a state in which a maximum voltage in a direction for contracting the piezoelectric body is applied to the piezoelectric body after the state shown in FIG. 14C.

Subsequently, in a maximum voltage applied state in a direction in which the piezoelectric body 171a contracts, the state in which the oscillating body A 171c does not come into contact with the rotor 172 continues (FIG. 14D and T3 in FIG. 15).

Figure 14E:
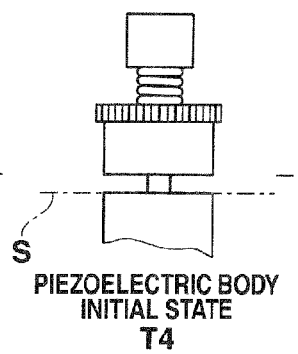
FIG. 14E is a diagram showing a state in which the applied voltage to the piezoelectric body is reduced to zero and the piezoelectric body returns to the initial state after the state shown in FIG. 14D.

The voltage applied to the piezoelectric body 171a decreases to zero and the piezoelectric body 171a returns to a state of displacement 0 in the initial state. However, the oscillating body A 171c does not come into contact with the rotor 172 (FIG. 14E and T4 in FIG. 15).

Further, when a voltage is applied in an extending direction of the piezoelectric body 171a and the piezoelectric body 171a, the oscillating body A 171c comes into contact with the rotor 172 in a predetermined place. Acceleration is applied to the fixed frame 122 in a direction away from the oscillating body A 171c (FIG. 14F and T5 in FIG. 15).

Figure 14F:
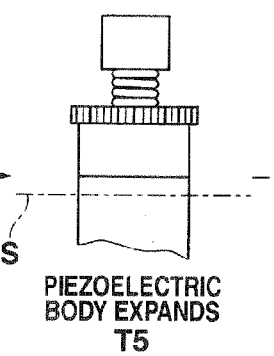
FIG. 14F is a diagram showing a state in which a voltage in a direction for expanding the piezoelectric body is applied to the piezoelectric body and the piezoelectric body expands again after the state shown in FIG. 14E.
Figure 14G:
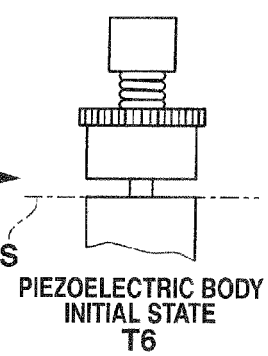
FIG. 14G is a diagram showing a state in which a voltage in a direction for contracting the piezoelectric body is applied to the piezoelectric body and the piezoelectric body returns to the initial state again after the state shown in FIG. 14F.

When a voltage is applied to the piezoelectric body 171a in the contracting direction again and the piezoelectric body 171a returns to the initial state, the oscillating body A 171c and the rotor 172 are not in contact with each other again (FIG. 14G and T6 in FIG. 15).

As explained above, the operation in one period of FIGS. 14C to 14G is repeated. FIGS. 14A to 14C are states of transitional characteristics from a stationary state to steady oscillation occurrence. Therefore, in a steady state, FIGS. 14C to 14G are repeated.

In one period from FIGS. 14C to 14G, the oscillating body A 171c comes into contact with the rotor 172 only at an instance near FIG. 14F. In most time of one period, the oscillating body A 171c and the rotor 172 are in the non-contact state. The friction force F is zero during the time.

Therefore, average friction force F in one period is extremely small. Actually, if the operation ring 111 is caused to operate during the noncontact time of the rotor 172 and the oscillating body A 171c, the operation ring 111 operates at the friction force F of 0. A brake is applied with instantaneous friction force at an interval of an oscillation period of the piezoelectric body 171a. However, since the oscillation period is extremely small, the operation ring 111 smoothly operates as if friction is steadily reduced.

As it is seen from this operation, when the oscillation amplitude of the piezoelectric body 171a is changed, a contact time of the oscillating body A 171c and the rotor 172 changes. When the oscillation amplitude is reduced to be extremely small (amplitude is reduced to a value close to 0), the oscillating body A 171c and the rotor 172 are in a state substantially the same as the state in which the oscillating body A 171c and the rotor 172 are always in contact with each other. The friction force is $F \approx \mu Fp$, where $\mu$ is a coefficient of friction of the contact surface of the oscillating body A 171c and the rotor 172 and Fp is the pressing force of the spring 173.

Figure 16:
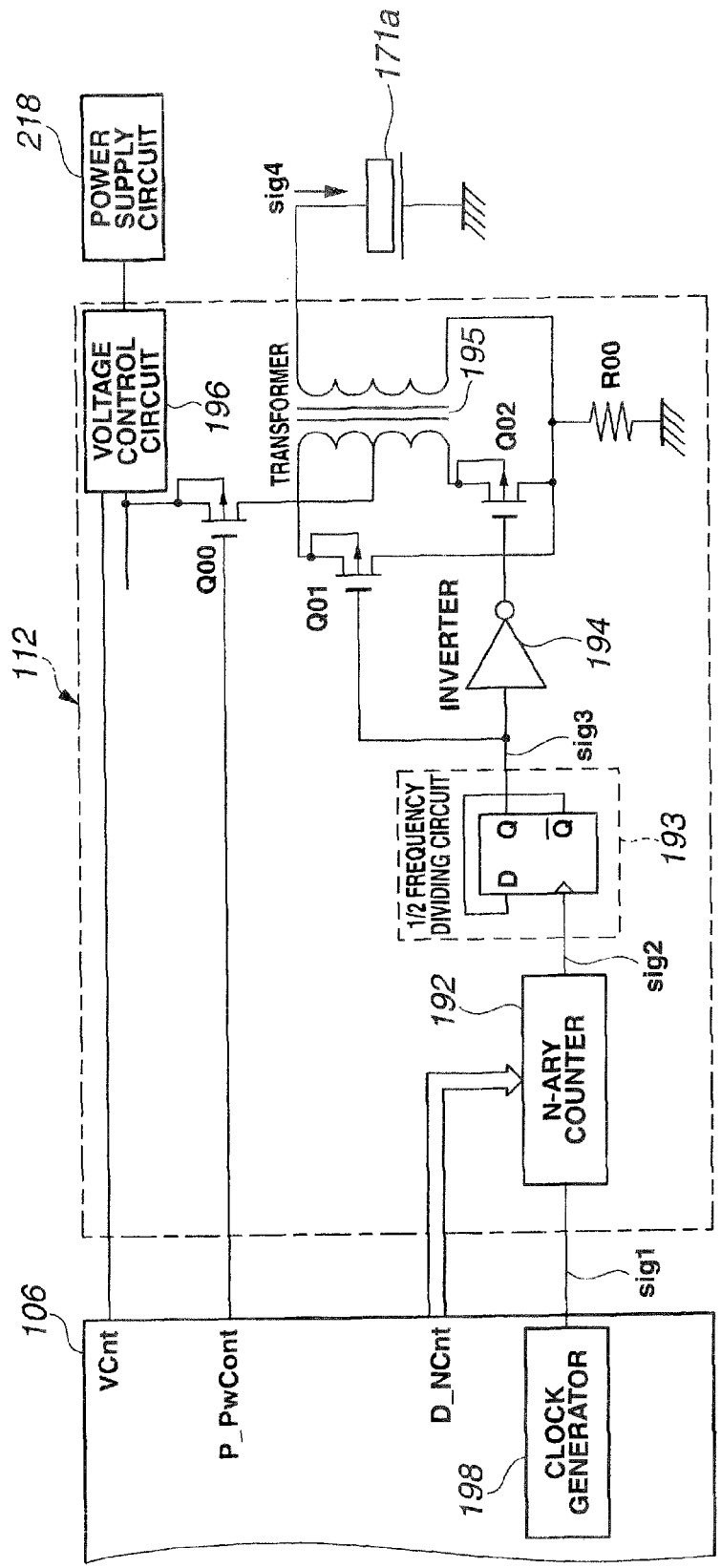
FIG. 16 is a circuit diagram showing a schematic configuration of a piezoelectric body control circuit for the piezoelectric body shown in FIG. 8.

FIG. 16 is a circuit diagram schematically showing a configuration of the piezoelectric body control circuit 112 of the piezoelectric body 171a. FIGS. 17A to 17D are time charts showing forms of signals outputted from the components in the piezoelectric body control circuit 112 shown in FIG. 16.

The piezoelectric body control circuit 112 illustrated herein includes a circuit configuration shown in FIG. 16. In the sections of the piezoelectric body control circuit 112, signals same as the signals (Sig1 to Sig4) having the waveforms represented by the time charts of FIGS. 17A to 17D are generated. The piezoelectric body control circuit 112 is controlled as explained below on the basis of the signals.

As illustrated in FIG. 16, the piezoelectric body control circuit 112 includes an N-ary counter 192, a ½ frequency dividing circuit 193, an inverter 194, plural MOS transistors Q00, Q01, and Q02, a transformer 195, and a resistor R00.

According to an ON/OFF switching operation of the MOS transistor Q01 and the MOS transistor Q02 connected to a primary side of the transformer 195, the signal (Sig4) of a predetermined period is generated on a secondary side of the transformer 195. The piezoelectric body 171a is driven on the basis of the signal of the predetermined period to cause oscillation shown in FIG. 17D.

The microcomputer for lens 106 controls the piezoelectric body control circuit 112 as explained below via two 10 ports P_PwCont and D_NCnt provided as control ports and a clock generator 198 present on an inside of the microcomputer for lens 106.

The clock generator 198 outputs a pulse signal (a basic clock signal) to the N-ary counter 192 at a frequency sufficiently earlier than a signal frequency applied to the piezoelectric body 171a. This output signal corresponds to the signal Sig1 having the waveform shown in FIG. 17A. This basic clock signal is inputted to the N-ary counter 192.

The N-ary counter 192 counts the pulse signal and outputs a count end pulse signal every time the count reaches a predetermined value "N." In other words, the N-ary counter 192 divides a frequency of the basic clock single into 1/N. This output signal corresponds to the signal Sig2 having the waveform shown in FIG. 17B. In the frequency-divided pulse signal, a duty ratio of High and Low is not 1:1. Therefore, the piezoelectric body control circuit 112 converts the duty ratio into 1:1 through the ½ frequency dividing circuit 193. This converted pulse signal corresponds to the signal Sig3 having the waveform shown in FIG. 17C.

In a High state of the converted pulse signal, the MOS transistor Q01 to which this signal is inputted is turned on. On the other hand, the pulse signal is applied to the MOS transistor Q02 through the inverter 194. Therefore, in a Low state of the pulse signal, the MOS transistor Q02 to which this signal is inputted is turned on. When the MOS transistor Q01 and the MOS transistor Q02 connected to the primary side of the transformer 195 are alternately turned on, a signal of a period like the signal Sig4 shown in FIG. 17D is generated on the secondary side.

A winding ratio of the transformer 195 is determined from an output voltage of the voltage control circuit 196 and a voltage necessary for driving of the piezoelectric body 171a. The resistor R00 is provided to restrict an excessively large current from flowing to the transformer 195. The power supply circuit 218 is provided, for example, in the camera main body 200. An output voltage of the power supply circuit 218 is supplied from the camera main body 200 (see FIG. 1) to the voltage control circuit 196 provided in the interchangeable lens barrel 100 (see FIG. 1) through the I/F 300 (see FIG. 1).

An output voltage of the voltage control circuit 196 is set and an applied voltage to the piezoelectric body 171a is determined from VCnt of the microcomputer for lens 106.

Oscillation amplitude of the piezoelectric body 171a is determined by the output voltage of the voltage control circuit 196.

FIG. 18 is a graph showing a state of displacement of a contact region at the time when oscillation amplitude of basic oscillation is changed by the voltage control circuit. As it is evident from FIG. 18, a contact position in a Z direction (an optical axis direction) of the oscillating body A 171c and the rotor 172 changes when amplitude is expanded with respect to reference amplitude. According to this expansion of the oscillation amplitude, time in which the oscillating body A 171c is in contact with the rotor 172 decreases and friction force of the oscillating body A 171c and the rotor 172 changes. However, even if the oscillation amplitude is expanded, friction force does not decrease to zero and converges to the fixed friction force F0 close to zero.

On the other hand, if the transducer 171 is not oscillating, i.e., if the oscillation amplitude is zero, when a coefficient of friction between the oscillating body A 171c and the rotor 172 is represented as $\mu$, assuming that pressing force is Fp, generated friction force is $F=\mu \times Fp$. When the oscillation amplitude is controlled by the voltage control circuit 196, the friction force can be changed from F to F0.

In order to generate a sense of click, the friction force between the oscillating body A 171c and the rotor 172 only has to be changed to correspond to a rotation position of the operation ring 111. A sense of click can be realized if the oscillation amplitude is changed to correspond to a position of the operation ring 111.

Figure 19A:
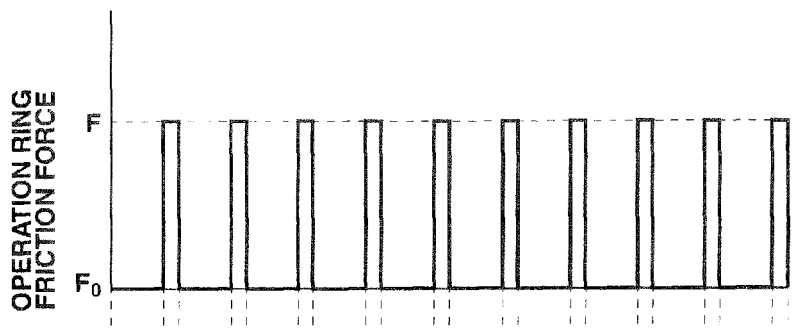
FIG. 19A is a graph showing a relation between a corresponding rotation angle of the operation ring for generating a sense of click and an operation force amount of the operation ring (operation ring friction force)
Figure 19B:
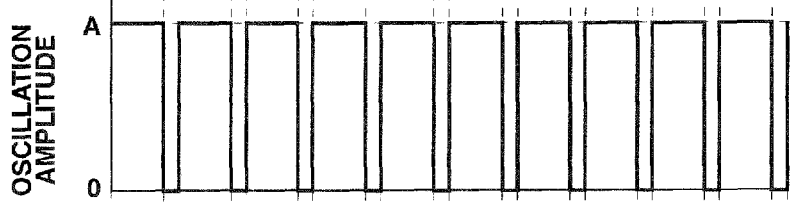
FIG. 19B is a graph showing operation amplitude of the transducer corresponding to the operation force amount of the operation ring (the operation ring friction force) shown in FIG. 19A.
Figure 19C:
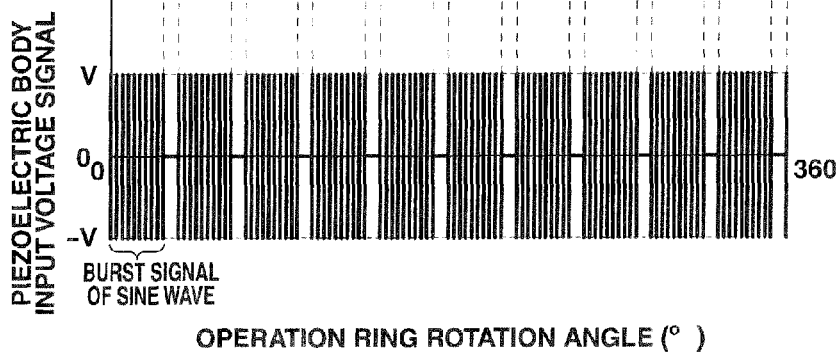
FIG. 19C is a graph showing a piezoelectric body input voltage signal corresponding to the oscillation amplitude of the transducer shown in FIG. 19B.

In this case, FIGS. 19A, 19B, and 19C are graphs showing a relation between a corresponding rotation angle of the operation ring for generating a sense of click and an operation force amount of the operation ring and oscillation amplitude and an input voltage of a transducer corresponding to the operation force amount. FIGS. 19A to 19C are examples. A form of this graph can be changed. For example, in FIGS. 19A, 19B, and 19C, clicks in ten places are set to be generated in one rotation of the operation ring 111. However, the number of clicks can be freely changed.

In FIGS. 19A, 19B, and 19C, clicks are distributed to the entire circumference at equal intervals. However, it is also possible to distribute clicks within a predetermined angle (e.g., 180°) and set operation ring friction force to F in the remaining 180°. Further, it is also possible to distribute the clicks at unequal intervals rather than the equal intervals.

When the operation ring 111 is set to focusing not requiring a sense of click, if the oscillation amplitude is fixed irrespective of a position of the operation ring 111, the friction force between the oscillating body A 171c and the rotor 172 is fixed and the operation force amount of the operation ring 111 is fixed. If the oscillation amplitude of the transducer 171 is set to a different value, the operation force amount of the operation ring 111 can be set to a different operation force amount.

Further, as shown in FIGS. 20A to 20C, it is possible to obtain a sense of click different from that shown in FIGS. 19A to 19C by giving an input voltage signal different from that shown in FIGS. 19A to 19C to the piezoelectric body 171a. Specifically, after suddenly expanding the oscillation amplitude from 0 to A, the oscillation amplitude is maintained for a predetermined time. Thereafter, rather than suddenly being reduced to 0 as shown in FIG. 19B, the oscillation amplitude is reduced to 0 in a predetermined time as shown in FIG. 20B. Consequently, it is also possible to increase the operation ring friction force F0 to a maximum value F in a predetermined time.

In FIG. 16, when the piezoelectric body 171a is driven, the MOS transistor Q00 has to be in an ON state and a voltage has to be applied from the voltage control circuit 196 to a center tap of the transformer 195. In this case, ON/OFF control for the MOS transistor Q00 is performed via the IO port P_Pw-Cont of the microcomputer for lens 106. A setting value "N" of the N-ary counter 192 can be set from the IO port D_NCnt of the microcomputer for lens 106. Therefore, the microcomputer for lens 106 can arbitrarily change a driving frequency of the piezoelectric body 171a by appropriately controlling the setting value "N."

It is also possible to set the driving frequency to a resonant frequency of the transducer 171, expand the oscillation amplitude of the transducer 171, and cause the transducer 171 to operate at a low voltage. When the driving frequency is set to the resonant frequency, control for detecting an oscillation state of the piezoelectric body 171a and tracking the resonant frequency is necessary. The detection of the oscillation state can be performed by detecting an electric current and a voltage inputted to the piezoelectric body 171a because, for example, at the resonant frequency, impedance of the piezoelectric body decreases, the electric current inputted to the piezoelectric body 171a increases, and phases of the electric current and the voltage change. Alternatively, it is possible to detect resonance of the transducer 171 by forming a part of the stacked single plates of the piezoelectric body 171a as piezoelectric bodies for oscillation detection and detecting a voltage or a phase of an output voltage from the piezoelectric body for oscillation detection.

According to Equation (1) below, a frequency outputted from the piezoelectric body control circuit 112 can be calculated.

$$fdrv = fpls/2N \quad (1)$$

where, N represents a setting value to the N-ary counter 192, fpls represents a frequency of an output pulse of the clock generator 198, and fdrv represents a frequency of a signal applied to the piezoelectric body 171a. The calculation based on Equation (1) is performed by, for example, the microcomputer for lens 106.

In this embodiment, the frequency fdrv is desirably set to a frequency equal to or higher than 20 kHz. The piezoelectric body 171a oscillates at the frequency fdrv. This frequency band is an ultrasound range and inaudible to human being. The digital camera shown in FIG. 1 is used for photographing of a moving image as well. When a moving image is photographed, in some case, sound is simultaneously recorded. Therefore, noise should be small. Since sound in an ultrasound band exceeds an audible range of the human being, a normal microphone cannot detect the sound.

Figure 21:
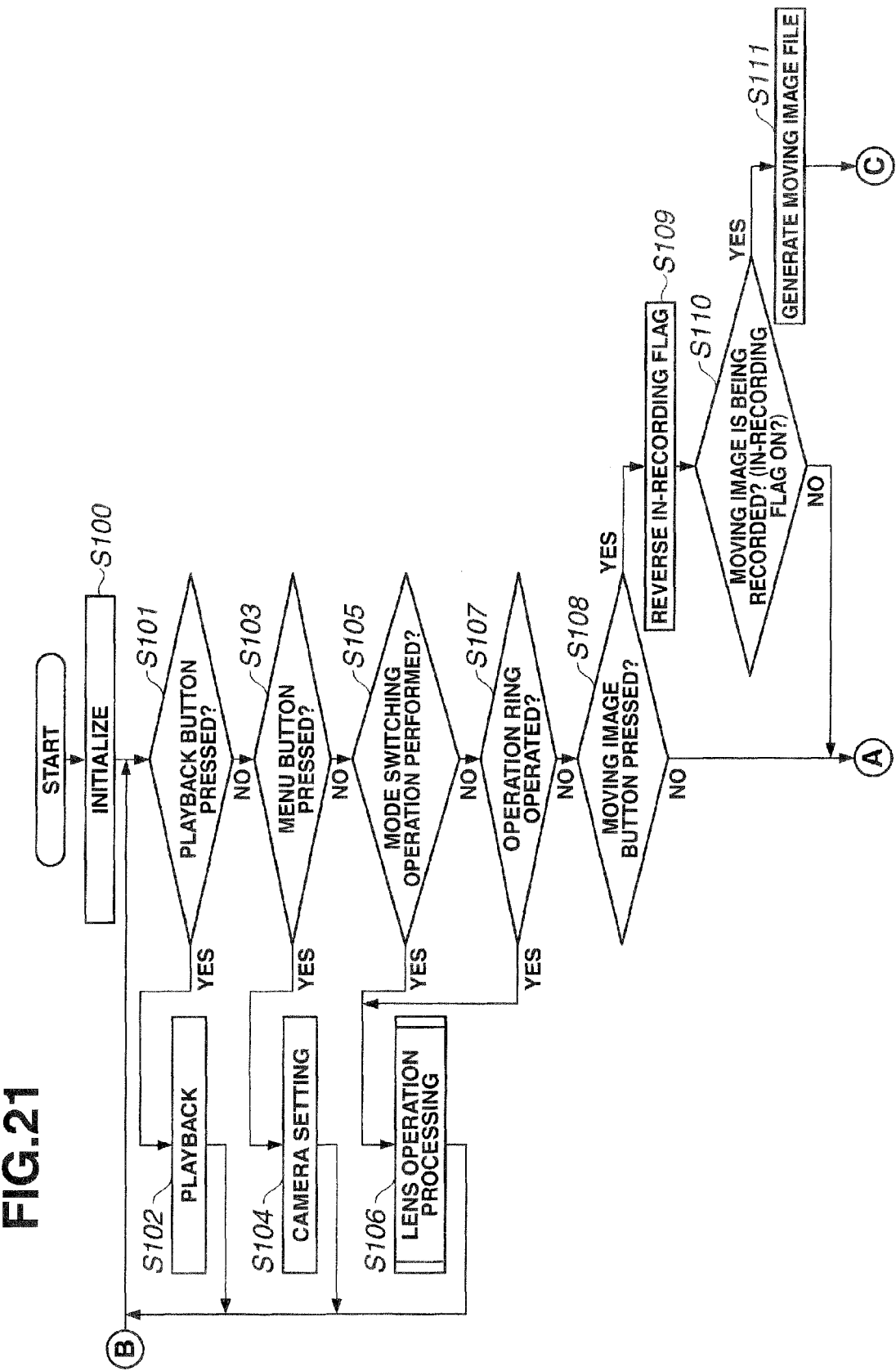
FIG. 21 is a flowchart for explaining a part (a former half) of a main processing sequence of the digital camera shown in FIG. 1.
Figure 22:
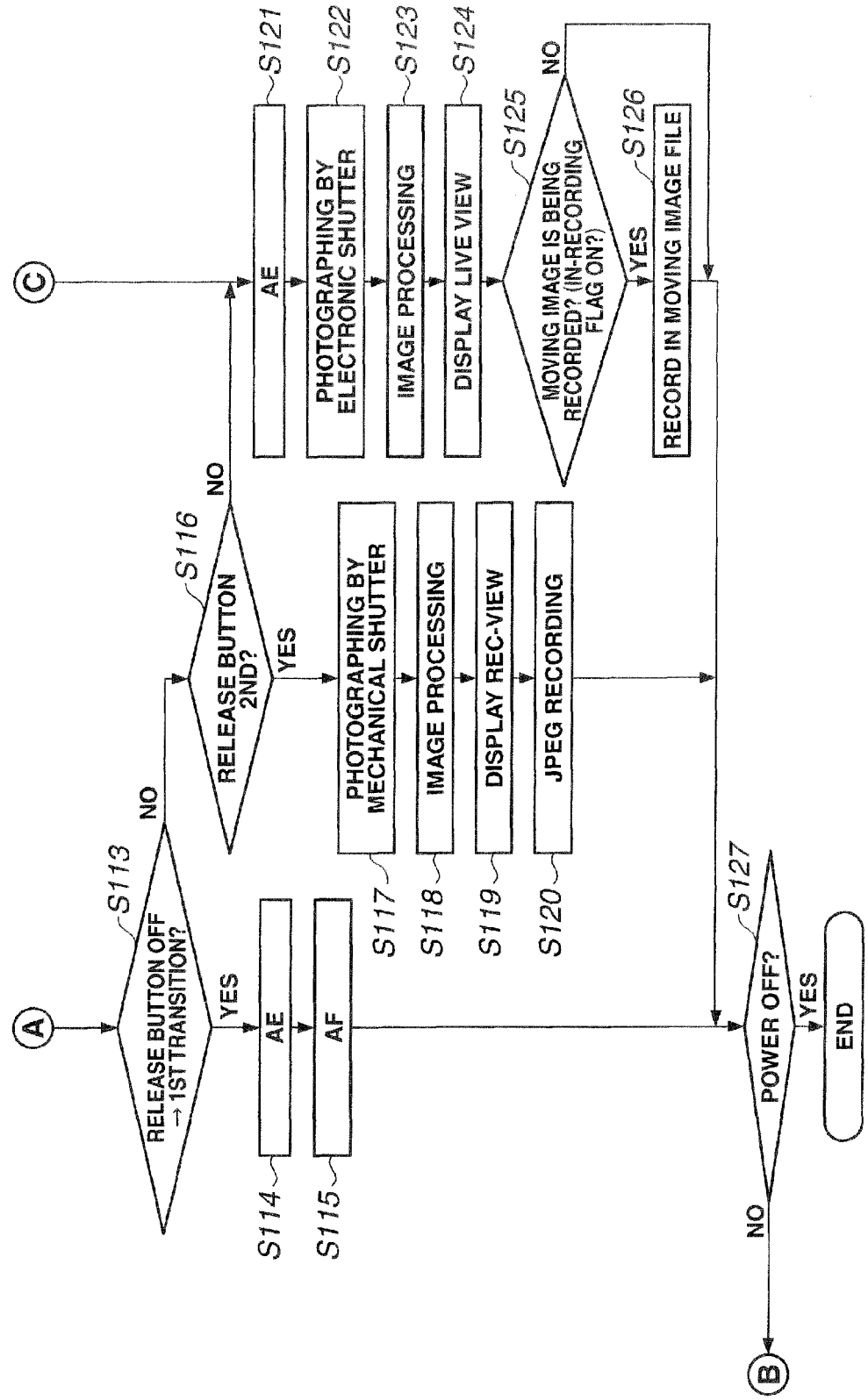
FIG. 22 is a flowchart for explaining a part (a latter half) of the main processing sequence of the digital camera shown in FIG. 1.

FIGS. 21 and 22 are flowcharts for explaining a main processing sequence performed by the digital camera to which the operation device according to this embodiment is applied. This processing flow starts when the power button is pressed by the user and the power supply for the digital camera is turned on.

When the processing flow starts, first, in FIG. 21 the microcomputer for main body 214 performs processing for initializing the sections of the digital camera (S100).

In this processing for initialization, for example, the microcomputer for main body 214 performs processing for resetting (setting to off) a flag indicating whether a moving image is being recorded (hereinafter referred to as "moving image in-recording flag"). The microcomputer for main body 214 also performs, for example, processing for switching setting of the operation mode of the operation ring 111 to the focus mode and changing control of the transducer 171 such that operability corresponding to the focus mode is obtained as operability of the operation ring 111.

Subsequently, the microcomputer for main body 214 determines whether the playback button is pressed (S101). If a result of the determination is Yes, the microcomputer for main body 214 performs playback processing (a playback sequence) (S102). In this playback processing, the microcomputer for main body 214 performs processing for, for example, displaying files recorded in the recording medium 212 on the LCD 210 as a list and playing back a file selected and determined by the user among the files. After the processing in S102, the microcomputer for main body 214 returns to the processing in S101.

On the other hand, if a result of the determination in S101 is No, the microcomputer for main body 214 determines whether the menu button is pressed (S103). If a result of the determination is Yes, the microcomputer for main body 214 performs camera setting processing (a camera setting sequence) (S104). In this camera setting processing, the microcomputer for main body 214 performs processing for, for example, displaying a menu for enabling a change of camera setting on the LCD 210 and changing camera setting according to camera setting selected and determined by the user in the menu. In this processing, the user can change, for example, setting of a recording mode for a still image to any one of JPEG recording, JPEG+RAW recording, RAW recording, and the like. The user can change setting of a recording format for a moving image file to any one of AVI: Motion-JPEG, AVCHD: H.264. MP4: H.264, and the like. Further, the user can change setting of a luminance change mode to shading addition, shading-around-person addition, not-set, and the like. After the processing in S105, the microcomputer for main body 214 returns to S102.

On the other hand, if a result of the determination in S103 is No, the microcomputer for main body 214 determines whether mode switching operation is performed (S105). If the mode switching operation section 108 is pressed, i.e., if a result of the determination is Yes, the microcomputer for main body 214 performs lens operation processing (a lens operation sequence) (S106). Details of this lens operation processing are explained below with reference to FIG. 23. The microcomputer for main body 214 performs setting corresponding to rotation operation of the operation ring 111 according to a switched mode or performs processing for rotation operation in a set mode. After the processing in S106, the microcomputer for main body 214 returns to S101.

Figure 23:
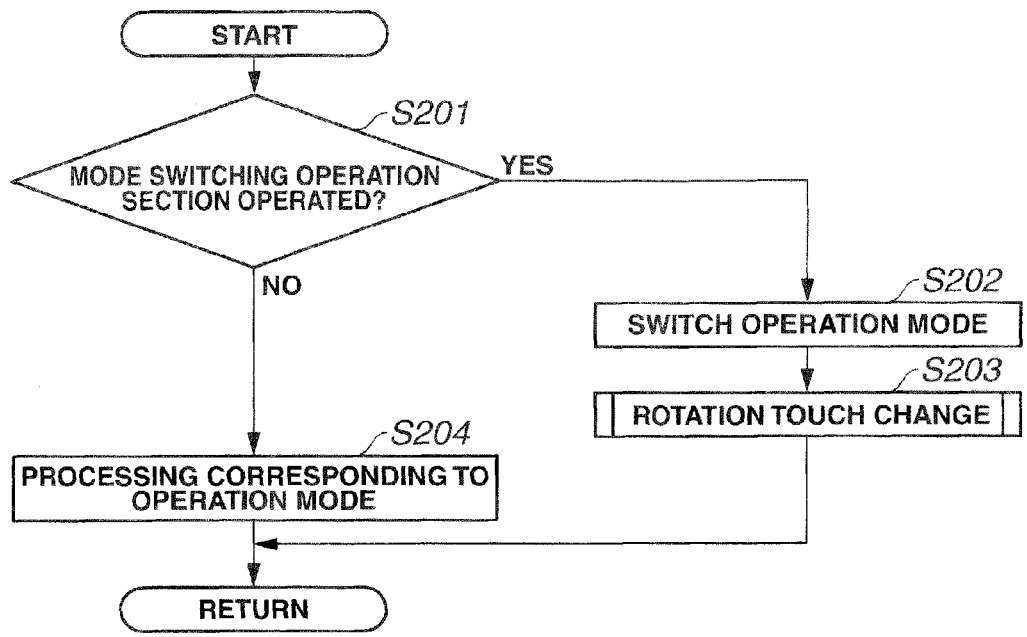
FIG. 23 is a flowchart for explaining details of a processing sequence of lens operation processing shown in FIG. 21 (step S106 in FIG. 21)

If the mode switching operation is not performed in S105, the microcomputer for main body 214 determines whether the operation ring 111 is rotated (S107). If rotation operation of the operation ring 111 is performed, the microcomputer for main body 214 shifts to S106 and performs the lens operation processing (S106; details are shown in FIG. 23). If the rotation operation of the operation ring 111 is not performed, i.e., if a determination result in S106 is No, the microcomputer for main body 214 determines whether a moving image button is pressed (S108).

If a determination result of the processing in S108 is Yes, the microcomputer for main body 214 reverses the moving image in-recording flag (S109). Reversing the moving image in-recording flag means reversing the moving image in-recording flag to ON if the moving image in-recording flag is OFF and reversing the moving image in-recording flag to OFF if the moving image in-recording flag is ON. After the processing in S109, the microcomputer for main body 214 determines whether a moving image is being recorded. In other words, the microcomputer for main body 214 determines whether the moving image in-recording flag is on (S110).

If a result of the determination is Yes, in order to start moving image recording, the microcomputer for main body 214 generates a new moving image file for recording (S111).

On the other hand, if a determination result of the processing in S108 is No, or is S110 is No, the microcomputer for main body 214 shifts to a flowchart in FIG. 22 (sigh A) and determines whether the digital camera transitions from a state in which the release button is not pressed to a state in which the release button is pressed and the first release switch is turned on (S113). If a result of the determination is Yes, the microcomputer for main body 214 performs AE processing (S114) and AF processing (S115) as a photographing preparation sequence.

On the other hand, if a result of the determination in S113 is No, the microcomputer for main body 214 determines whether the release button is pressed and the second release switch is turned on (S116). If a result of the determination is Yes, the microcomputer for main body 214 performs a photographing sequence (S117 to S120). In this photographing sequence, the microcomputer for main body 214 performs photographing processing by the mechanical shutter 201 (S117) and applies image processing for still image photographing to obtained image data (S118). The microcomputer for main body 214 performs rec-view display for displaying the image data on the LCD 210 for an extremely short time (set seconds; e.g., 3 seconds or 5 seconds) (S119). Thereafter, the microcomputer for main body 214 records the image data in the recording medium 212 as a JPEG file (S120).

After the processing in S111, if a result of the determination in S116 is No, the microcomputer for main body 214 performs AE processing for moving image photographing (S121), performs photographing processing by an electronic shutter (S122), applies image processing for moving image photographing to obtained image data (S123), and performs live view display for displaying the image data on the LCD 210 (S124). The microcomputer for main body 214 determines whether a moving image is being recorded. In other words, the microcomputer for main body 214 determines whether the moving image in-recording flag is on (S125). If a result of the determination is Yes, the microcomputer for main body 214 compresses the image data in a set format and records the image data in the moving image file generated in S111 (S126).

After the processing in S115, after the processing in S120, after the processing in S126, or if a result of the determination in S125 is No, the microcomputer for main body 214 determines whether the power button is pressed and the power supply for the digital camera is turned off (S127). If a result of the determination is No, the microcomputer for main body 214 returns to the processing in S101 in FIG. 21. If a result of the determination is Yes, the microcomputer for main body 214 ends this processing sequence.

FIG. 23 is a flowchart for explaining details of a processing sequence of the lens operation processing (S106 in FIG. 21).

As shown in FIG. 23, when this processing sequence is started, first, the microcomputer for main body 214 determines whether lens operation performed if a result of the determination in S106 in FIG. 21 is Yes is pressing of the mode switching operation section 108 (S201). If a result of the determination is Yes (the mode switching operation section 108 is pressed), the microcomputer for main body 214 switches setting of the operation mode of the operation ring 111 according to predetermined order every time the pressing operation is performed (S202). The predetermined order is, for example, order of the focus mode, the zoom mode, the photographing mode, the ISO sensitivity mode, the shutter speed mode, and the diaphragm mode and, after the diaphragm mode, returning to the focus mode. In this case, for example, when the mode switching operation section 108 is pressed if the setting of the operation mode is the focus mode, the setting of the operation mode is switched from the focus mode to the zoom mode.

On the other hand, after the processing in S202, the microcomputer for main body 214 performs processing for changing a rotation touch of the operation ring 111 according to the switched setting of the operation mode (S203). Details of this rotation touch changing processing are explained below with reference to FIG. 24.

On the other hand, if a result of the determination in S201 is No, i.e., if the mode switching operation is not performed and the operation ring 111 is operated in an already-set operation mode state, the microcomputer for main body 214 performs processing corresponding to the setting of the operation mode according to a rotating direction and a rotation amount of the operation ring 111 (S204).

In the processing in S204, the microcomputer for main body 214 performs processing explained below according to the setting of the operation mode. In the following explanation, rotating the operation ring 111 to the right means rotating the operation ring 111 to the right viewed from the camera main body 200 side. Rotating the operation ring 111 to the left means rotating the operation ring 111 to the left viewed from the camera main body 200 side.

The processing corresponding to the setting of the operation mode performed in S204 is, for example, processing for changing the rotation touch set in S203. The processing is set as explained below.

(1) If the setting of the operation mode is the focus mode, rotation resistance of the operation ring 111 is set to be always minimized in a range in which the rotation resistance can be set. Therefore, a sense of click operation is set not to be generated. The microcomputer for main body 214 performs processing for moving the focus lens 101 by a movement amount corresponding to a rotation amount (or a rotation position) of the operation ring 111 to a nearest side when the operation ring 111 is rotated to the right (a direction viewed from the camera main body side) and to an infinite side when the operation ring 111 is rotated to the left (a direction viewed from the camera main body side).

As explained above, the operation ring 111 and the rotor 172 are rotationally coupled to each other and the rotor 172 and the transducer 171 are in friction contact with each other. Therefore, generated friction force can be controlled by controlling the transducer 171 to change friction force. Therefore, when the user manually rotates the operation ring 111, the user can generate rotation resistance of a predetermined magnitude as a rotation touch suitable for focus operation.

(2) If the setting of the operation mode is the zoom mode, as in the focus mode, control of the transducer 171 is performed such that the rotation resistance is always minimized in the range in which the rotation resistance can be set. Therefore, a sense of click is set not to be generated. The microcomputer for main body 214 performs processing for moving the zoom lens 102 by a movement amount corresponding to a rotation amount (or a rotation position) of the operation ring 111 in a direction in a direction in which a focal length decreases when the operation ring 111 is rotated to the right and in a direction in which the focal length increases when the operation ring 111 is rotated to the left. Consequently, the user can obtain a rotation touch suitable for zoom operation when the user manually rotates the operation ring 111.

(3) If the setting of the operation mode is the photographing mode, when the operation ring 111 is rotated to the right with a predetermined sense of click operation, the microcomputer for main body 214 performs processing for sequentially switching setting of the photographing mode according to predetermined order to correspond to a rotation amount (or a rotation position) of the operation ring 111. The predetermined order is order of photographing modes of, for example, P (program AE), A (diaphragm preference AE), S (shutter speed preference AE), M (manual exposure), and ART (art). ART is a photographing mode in which artistic processing (e.g., image processing for applying a unique tone and a special effect found in posters, paintings, and the like) can be applied to a photographed image to record the image.

On the other hand, when the operation ring 111 is rotated to the left with a predetermined sense of click operation, the microcomputer for main body 214 performs processing for sequentially switching setting of the photographing mode according to order opposite to the order in the case of the right rotation to correspond to a rotation amount (or a rotation position) of the operation ring 111. A sense of click operation obtained when the setting of the operation mode is the photographing mode is set by processing equivalent to S203 in FIG. 23 such that a rotation angle of the operation ring 111 is divided into angles of 72 degrees at equal angle intervals and a sense of click is obtained five times in one rotation. Control of the transducer 171 is performed to obtain such a sense of click.

The predetermined five rotation angles at the equal angle intervals are rotation angles from a reference position (an absolute position) of the operation ring 111 and correspond to the five photographing modes (P, A, S, M, and ART). Therefore, when the user manually rotates the operation ring 111, the user can obtain a rotation touch suitable for setting operation for the photographing mode.

Even if the photographing mode is set to the five photographing modes (P, A, S, M, and ART), the photographing mode can be set not to generate a sense of click operation. In this case, a "sense of click unnecessary mode" is added to the operation modes selected by pressing of the mode switching operation section 108. If the "sense of click unnecessary mode" is selected in the processing equivalent to S202 in FIG. 23, rotation resistance of the operation ring 111 only has to be set to a predetermined value in the processing equivalent to S203. Besides the "sense of click unnecessary mode," an "A rotation resistance mode," a "B rotation resistance mode," and the like may be provided in the operation modes selected by the pressing of the mode switching operation section 108 such that the rotation resistance can be selected. In this case, the operation ring 111 only has to be manually rotated with reference to a liquid crystal display section, an indicator, or the like provided in the lens barrel.

(4) If the setting of the operation mode is the ISO sensitivity mode, when the operation ring 111 is rotated to the right with a predetermined sense of click operation, the microcomputer for main body 214 performs processing for sequentially switching setting of the ISO sensitivity according to predetermined order to correspond to a rotation amount (a rotation position) of the operation ring 111. The predetermined order is order of ISO sensitivity of, for example, 100, 200, 400, 800, 1600, 3200, 6400, and 12800. On the other hand, when the operation ring 111 is rotated to the left with a predetermined sense of click operation, the microcomputer for main body 214 performs processing for sequentially switching the setting of the ISO sensitivity according to order opposite to that in the case of the right rotation to correspond to a rotation amount of the operation ring 111.

A sense of click operation obtained when the setting of the operation mode is the ISO sensitivity mode is set by processing equivalent to S203 in FIG. 23 such that a rotation angle of the operation ring 111 is divided into angles of 45 degrees at equal angle intervals and a sense of click is obtained eight times in one rotation. Control of the transducer 171 is performed to obtain such a sense of click.

The predetermined eight rotation angles at the equal angle intervals are rotation angles from the reference position of the operation ring 111 and correspond to the eight kinds of ISO sensitivity (100, 200, 400, 800, 1600, 3200, 6400, and 12800). Therefore, when the user manually rotates the operation ring 111, the user can obtain a rotation touch suitable for setting operation for the ISO sensitivity. As in the photographing mode, the "sense of click unnecessary mode," the "A rotation resistance mode," the "B rotation resistance mode," and the like can be selected. Even if the ISO sensitivity is set to the eight kinds of ISO sensitivity (100, 200, 400, 800, 1600, 3200, 6400, and 12800), the ISO mode can be set to not generate a sense of click operation. In this case, the operation ring 111 only has to be manually rotated with reference to a liquid crystal display section, an indicator, or the like provided in the lens barrel.

(5) If the setting of the operation mode is the shutter speed mode, rotation resistance is set to increase as the rotation angle of the operation ring 111 increases in the predetermined rotation angle range of the operation ring 111 and suddenly increase outside the predetermined rotation angle range. Processing for switching setting of shutter speed is performed according to a rotation amount (or a rotation position) of the operation ring 111 in a direction for reducing exposure time when the operation ring 111 is rotated to the right and in a direction for increasing the exposure time when the operation ring 111 is rotated to the left.

The direction for reducing the exposure time is also a direction for increasing the shutter speed. The direction for increasing the exposure time is also a direction for reducing the shutter speed. The predetermined rotation angle range is a range of a rotation angle from the reference position of the operation ring 111 and is associated in advance with a range of shutter speed that can be switched. Therefore, a lower limit of the rotation angle range corresponds to highest shutter speed and an upper limit of the rotation angle range corresponds to lowest shutter speed. Consequently, when the user manually rotates the operation ring 111 in order to switch the setting of the shutter speed to setting of desired shutter speed, the user can obtain a rotation touch suitable for the setting operation of the shutter speed. For example, when the user switch the setting of the shutter speed to the setting of desired shutter speed, the user can determine, according to a sense of rotation resistance of the operation ring 111, a rotating direction of the operation ring 111 for the switching. The user can sense, according to a suddenly increasing sense of rotation resistance of the operation ring 111, that the user is about to switch the setting of the shutter speed exceeding the range of the shutter speed that can be switched.

(6) If the setting of the operation mode is the diaphragm mode, as in the shutter speed mode, rotation resistance is set to increase as the rotation angle of the operation ring 111 increases in a range of the predetermined rotation angle range of the operation ring 111 and suddenly increase outside the predetermined rotation angle range. Processing for switching setting of a diaphragm is performed according to a rotation amount (or a rotation position) of the operation ring 111 in a direction for stopping down the diaphragm mechanism 103 when the operation ring 111 is rotated to the right and in a direction for opening the diaphragm mechanism 103 when the operation ring 111 is rotated to the left. The direction for stopping down the diaphragm mechanism 103 is also a direction for increasing a numerical value of a diaphragm value (an F value). The direction for opening the diaphragm mechanism 103 is also a direction for reducing the numerical value of the diaphragm value (the F value). The predetermined rotation angle range is a range of a rotation angle from the reference position of the operation ring 111 and is associated in advance with a range of a diaphragm that can be switched. Therefore, a lower limit of the rotation angle range corresponds to a smallest F value and an upper limit of the rotation angle range corresponds to a largest F value.

Consequently, when the user manually rotates the operation ring 111 in order to switch the setting of the diaphragm to setting of desired diaphragm, the user can determine a rotating direction of the operation ring 111 according to a sense of rotation resistance of the operation ring 111. The user can sense, according to a suddenly increasing sense of rotation resistance of the operation ring 111, that the user is about to switch the setting of the diaphragm exceeding the range of the diaphragm that can be switched.

The shutter speed mode and the diaphragm mode may be set such that a sense of click can be obtained. When the shutter speed mode and the diaphragm mode are set such that a sense of click can be obtained, when the user manually rotates the operation ring 111, the user sense, for example, a number-of-stages change amount (indicating a change in a diaphragm value as an exposure amount) of the diaphragm among click positions of the operation ring 111 as a rotation touch suitable for setting operation for the diaphragm. In this case, a change of the number of clicks and a change of a rotation angle of the operation ring 111 corresponding to the click intervals may be performed according to the set number-of-steps change amount.

The setting of the operation modes and the processing operation for the setting are explained above. However, in the processing corresponding to the setting of the operation modes, it is also possible to perform, in an opposite manner, the processing performed according to the rotating direction of the operation ring 111. Specifically, the processing performed when the operation ring 111 is rotated to the left can be performed when the operation ring 111 is rotated to the right. The processing performed when the operation ring 111 is rotated to the right can be performed when the operation ring 111 is rotated to the left.

When the processing in S204 in FIG. 23 (the operations indicated in the items (1) to (6)) ends or after the processing in S203 ends, the microcomputer for main body 214 ends the series of processing sequence shown in FIG. 23 and returns to the original processing (return).

Figure 24:
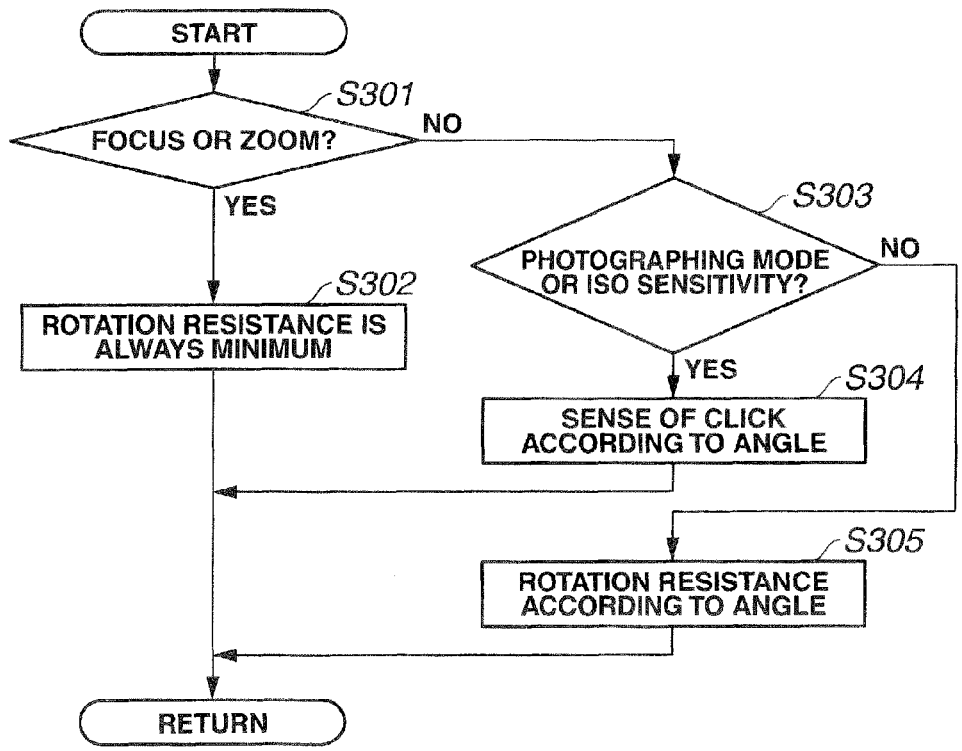
FIG. 24 is a flowchart for explaining details of a processing sequence of rotation touch changing processing shown in FIG. 23 (step S203 in FIG. 23)

FIG. 24 is a flow chart for explaining details of a processing sequence of the rotation touch changing processing (S203 in FIG. 23). As shown in FIG. 24, when this processing sequence starts, first, the microcomputer for main body 214 determines whether the setting of the operation mode switched in S202 is the focus mode or the zoom mode (S301). If a result of the determination is Yes (if the operation mode is the focus mode or the zoom mode), the microcomputer for main body 214 starts control of the transducer 171 for always minimizing rotation resistance of the operation ring 111 (S302).

On the other hand, if a result of the determination in S301 is No, the microcomputer for main body 214 determines whether the setting of the operation mode switched in S202 is the photographing mode or the ISO sensitivity mode (S303). If a result of the determination is Yes (if the operation mode is the photographing mode or the ISO sensitivity mode), the microcomputer for main body 214 starts control of the transducer 171 such that, as a rotation touch of the operation ring 111, a sense of click is obtained at predetermined five or eight rotation angles at equal angle intervals of the operation ring 111 (S304).

On the other hand, if a result of the determination in S303 is No, the setting of the operation mode switched in S202 is the shutter speed mode or the diaphragm mode. In this case, the microcomputer for main body 214 starts control of the transducer 171 such that, as a rotation touch of the operation ring 111, rotation resistance increases as a rotation angle of the operation ring 111 with respect to the reference position increases in a predetermined rotation angle range of the operation ring 111 and the rotation resistance suddenly increases outside the predetermined rotation angle range (S305).

After the processing in S302, after the processing in S304, or after the processing in S305, the microcomputer for main body 214 returns to S101 in FIG. 21 from the rotation touch changing subroutine.

Figure 25:
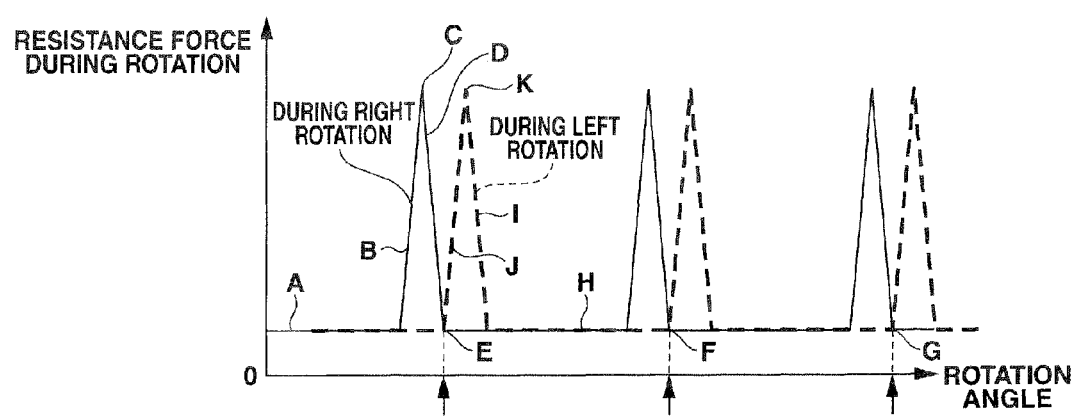
FIG. 25 is a diagram showing an example of a relation between a rotation angle and rotation resistance force of the operation ring at the time when control of the transducer is started (step S304 in FIG. 24) in the rotation touch changing processing shown in FIG. 24.

FIG. 25 is a diagram showing an example of a relation between a rotation angle and rotation resistance of the operation ring 111 at the time when control of the transducer 171 is started (step S304 in FIG. 24) in order to give a sense of click to the operation ring 111 in the rotation touch changing processing shown in FIG. 24.

In FIG. 25, a horizontal axis indicates a rotation angle from the reference position of the operation ring 111 and a vertical axis indicates rotation resistance (resistance during rotation) of the operation ring 111. A solid line indicates a relation between a rotation angle and rotation resistance at the time when the operation ring 111 is rotated to the right. A dotted line indicates a relation between a rotation angle and rotation resistance force at the time when the operation ring 111 is rotated to the left. The operation ring 111 is set such that the rotation angle increases when the operation ring 111 is rotated to the right and the rotation angle decreases when the operation ring 111 is rotated to the left.

Three rotation angle positions E, F, and G indicated by three arrows shown in FIG. 25 are set at equal angle intervals from one another and indicate rotation angles at which setting in mode states of the photographing mode or the ISO sensitivity mode are switched. The rotation angles indicated by the three arrows are equivalent to the predetermined five or eight rotation angles at equal angle intervals of the operation ring 111.

As indicated by the solid line in FIG. 25, the relation between the rotation angle and the rotation resistance at the time when the operation ring 111 is rotated to the right changes as explained below.

When the control of the transducer 171 is started by the processing in S304 in FIG. 24 and the operation ring 111 is rotated to the right, as shown in FIG. 25, in a position before a rotation angle at which the setting in the mode states of the photographing mode or the ISO sensitivity mode is switched (sign A in FIG. 25), the rotation resistance increases at a fixed inclination (sign B in FIG. 25) indicated by sign B in FIG. 25. In a position closer to the rotation angle at which the setting is switched (sign C in FIG. 25), the rotation resistance decreases at a fixed inclination indicated by sign D in FIG. 25. In a position reaching the rotation angle at which the setting is switched (sign E in FIG. 25), the rotation resistance returns to the original rotation resistance, i.e., the original rotation resistance indicated by sign A in FIG. 25. According to such a change in the rotation resistance of the operation ring 111, the user can obtain a sense of click when the operation ring 111 reaches the rotation angle at which the setting is switched.

As indicated by the dotted line in FIG. 25, the relation between the rotation angle and the rotation resistance at the time when the operation ring 111 is rotated to the left changes in a manner opposite to that indicated by the solid line in the figure. When the control of the transducer 171 is started by the processing in S304 and the operation ring 111 is rotated to the left, in H before the rotation angle at which the setting in the mode states of the photographing mode or the ISO sensitivity mode is switched (rotation resistance is the same as that in the position equivalent to A), the rotation resistance increases at a fixed inclination indicated by sign I in FIG. 25. In a position indicated by sign K in FIG. 25 closer to the rotation angle at which the setting is switched, the rotation resistance decreases at a fixed inclination indicated by sign J in the figure. In a position reaching the rotation angle at which the setting is switched indicated by sign E in FIG. 25, the rotation resistance returns to the original rotation resistance indicated by signs A and H in the figure.

The rotation angle E at which the setting is switched, i.e., a rotation angle at which the setting is switched in the right rotation and a rotation angle at which the setting is switched in the left rotation are in the same rotation angle position. The rotation angle E is set such that the same sense of click is generated in the operation ring 111 in the same setting switching position irrespective of the left rotation and the right rotation and the setting in the mode states is switched. When the rotation resistance and positions for mode switching are set, the operation ring 111 can be operated to rotate with small resistance in the mode states. Since a sense of click is obtained immediately before the mode switching, it is possible to smoothly perform the operation.

Figure 26:
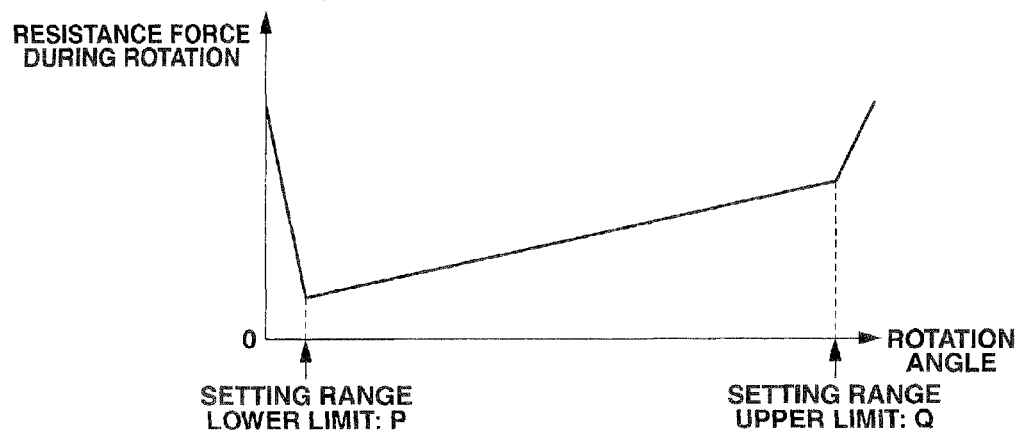
FIG. 26 is a diagram showing an example of a relation between the rotation angle and the rotation resistance force of the operation ring at the time when the control of the transducer is started (step S305 in FIG. 24) in the rotation touch changing processing shown in FIG. 24.

FIG. 26 is a diagram showing an example of a relation between the rotation angle and the rotation resistance of the operation ring at the time when the control of the transducer 171 is started (the processing in step S305 in FIG. 24), for example, in the case or the shutter speed mode or the diaphragm mode, in the rotation touch changing processing in FIG. 24.

In FIG. 26, a horizontal axis indicates a rotation angle from the reference position of the operation ring 111 and a vertical axis indicates rotation resistance (resistance during rotation) of the operation ring 111.

In FIG. 26, two rotation angle positions P and Q indicated by two arrows indicate a lower limit (P) and all upper limit (Q) in the predetermined rotation angle range of the operation ring 111. The lower limit and the upper limit correspond to highest shutter speed and lowest shutter speed or a smallest F value and a largest F value.

When control of the transducer 171 is starred by the processing in S305 in FIG. 24 and the operation ring 111 is rotated, as shown in FIG. 26, the rotation resistance changes as explained below. In the predetermined rotation angle range of the operation ring 111, the rotation resistance increases as the rotation angle of the operation ring 111 increases and the rotation resistance decreases as the rotation angle of the operation ring 111 decreases. According to such a change in the rotation resistance of the operation ring 111, in switching to desired setting, the user can determine a rotating direction of the operation ring 111 for the switching according to a sense of rotation resistance of the operation ring 111. Outside the predetermined rotation angle range of the operation ring 111 (when the rotation angle is smaller than P or larger than Q), the rotation resistance is set to suddenly increase. According to such a change in the rotation resistance of the operation ring 111, the user can sense that the user is about to switch the setting of the shutter speed or the diaphragm exceeding the range of the setting in which the shutter speed or the diaphragm can be switched.

Figure 27:
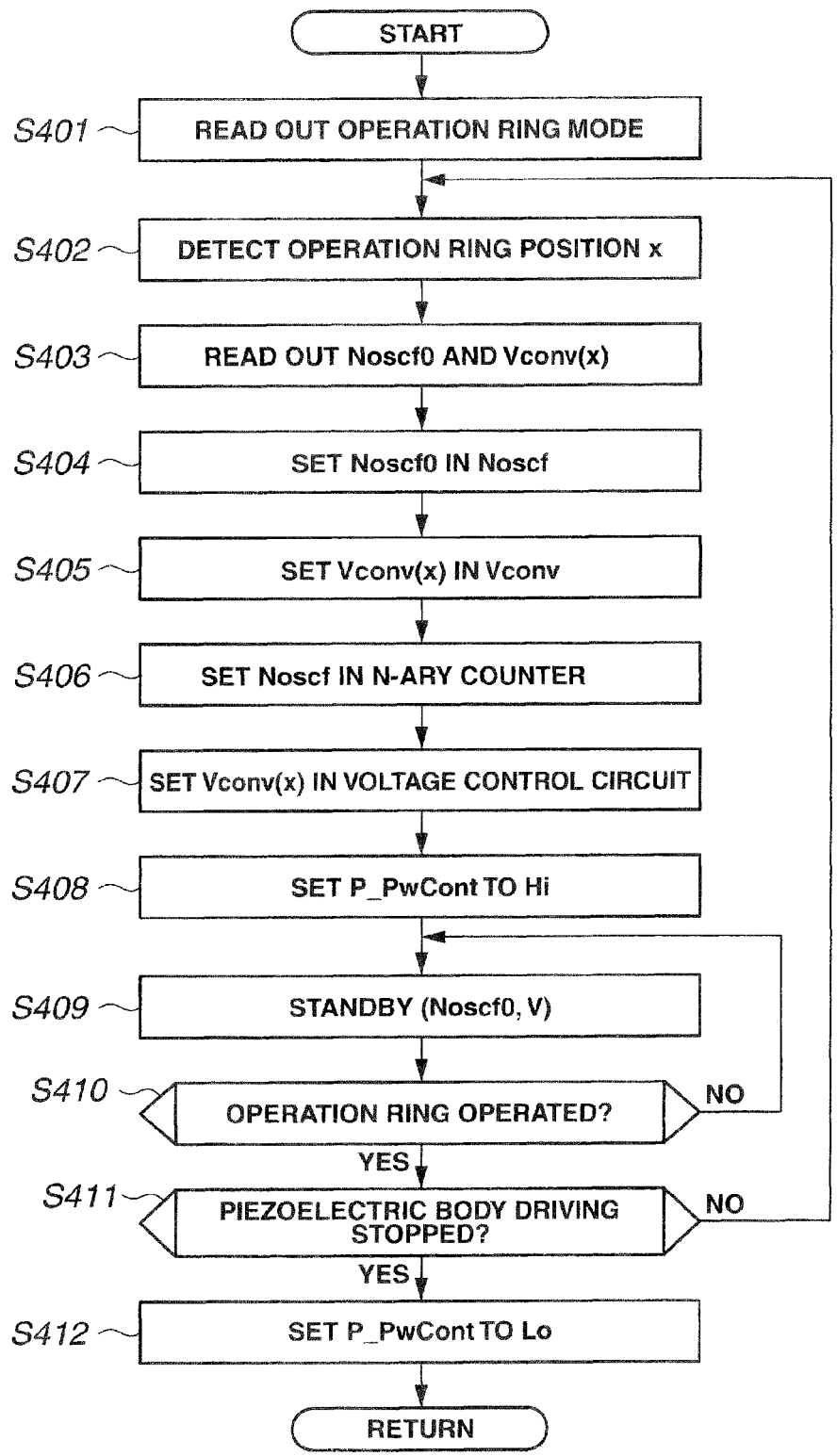
FIG. 27 is a flowchart for explaining an example of a processing sequence (step S304 in FIG. 24) of the microcomputer for lens that controls a sense of operation of the operation ring.

FIG. 27 is a flowchart for explaining an example of a processing sequence of the microcomputer for lens 106 for controlling a sense of operation of the operation ring 111. As an example, a processing sequence in obtaining a sense of click serving as a sense of operation of the operation ring 111 is explained.

As shown in FIG. 27, when this sequence starts, first, the microcomputer for lens 106 reads out an operation ring mode of the operation ring 111 from the flash memory 107 (S401). In this example, it is assumed that, when the setting of the operation mode is switched according to pressing of the mode switching operation section 108, information concerning the switched operation mode is stored in the flash memory 107. In the following explanation, the photographing mode or the ISO sensitivity mode is stored in the flash memory 107 and information concerning the photographing mode and the ISO sensitivity mode is read out (S401).

Subsequently, the microcomputer for lens 106 detects a reference position x of the operation ring 111 on the basis of an output signal of the position sensor 109 (S402). The reference position x of the operation ring 111 is a position with respect to the reference position of the operation ring 111. The reference position x corresponds to the rotation angle of the operation ring 111 shown in FIGS. 19A to 19C and FIGS. 20A to 20C.

Subsequently, the microcomputer for lens 106 reads out a frequency Noscf0 and a voltage Vconv(x) corresponding to the reference position x detected in the processing in S402 from the flash memory 107 (S403). In this example, it is assumed that information concerning the frequency Noscf0 and the voltage Vconv(x) corresponding to the reference position x is stored in the flash memory 107 in advance. The voltage Vconv(x) corresponding to the reference position x is, for example, experimentally determined on the basis of corresponding force amount data obtained from a mechanical click mechanism in the past. The reference position x corresponds to the rotation angle of the operation ring 111 shown in FIGS. 19A to 19C and FIGS. 20A to 20C.

Subsequently, the microcomputer for lens 106 sets the frequency Noscf0 read out in the processing in S403 in a frequency Noscf (S404) and sets the voltage Vconv(x) read out in the processing in S403 in a voltage Vconv (S405).

The microcomputer for lens 106 sets the voltage Vconv set in the processing in S405 in the voltage control circuit 196 via an IO port Vent of the microcomputer for lens 106 (S407).

Subsequently, the microcomputer for lens 106 sets the IO port P_PwCont of the microcomputer for lens 106 to Hi (S408). Consequently, oscillation of the piezoelectric body 171a starts. The microcomputer for lens 106 changes to a standby state (S409). In the standby state, the oscillation of the piezoelectric body 171a continues under the setting.

Subsequently, the microcomputer for lens 106 determines whether the operation ring 111 is operated (S410). If a result of the determination is No, the microcomputer for lens 106 returns to S409.

On the other hand, if a result of the determination of the processing in S409 is Yes (if the operation ring 111 is operated), the microcomputer for lens 106 determines whether driving of the piezoelectric body 171a is stopped (S411). If a result of the determination in S411 is Yes, i.e., when operation such as pressing of the playback button is performed, the microcomputer for lens 106 determines that the driving of the piezoelectric body 171a is stopped. The microcomputer for lens 106 sets the IO port P_ PwCont of the microcomputer for lens 106 to Lo (S412). Consequently, the oscillation of the piezoelectric body 171a stops. Then, this processing sequence ends.

On the other hand, if a result of the determination of the processing in S411 is No, i.e., if the oscillation of the piezoelectric body 171a does not stop, the microcomputer for lens 106 returns to the processing in S402. The processing in S402 and subsequent steps is repeated again.

According to such a processing sequence, it is possible to realize the operation ring 111 having a touch same as a mechanical sense of click. When information corresponding to the photographing mode, information concerning the ISO sensitivity mode, or the like is stored in the flash memory 107 as the information concerning the voltage Vconv(x) corresponding to the reference position x, it is possible to realize, according to the photographing mode, the ISO sensitivity mode, or the like, the operation ring 111 having a sense of click at different position intervals (angle intervals).

The piezoelectric body 171a explained with reference to FIGS. 6 and 9 is suitable for obtaining a sense of click of the operation ring 111 in this embodiment because the piezoelectric body 171a can respond at high speed shorter than 1 ms and can instantaneously change friction.

Second Embodiment

A second embodiment of the present invention is explained below with reference to FIGS. 28 to 32.

This embodiment is an embodiment in which a manual focus mode (hereinafter referred to as MF mode) is further added as a mode selected by the mode switching operation section 108 and is an embodiment concerning a state of the display section 115 at the time when the operation ring 111 is rotated in a state in which the operation mode is switched to the MF mode.

A basic configuration of this embodiment is substantially the same as that in the first embodiment. Therefore, the same components are denoted by the same reference numerals and signs and detailed explanation of the components is omitted.

Figure 28:
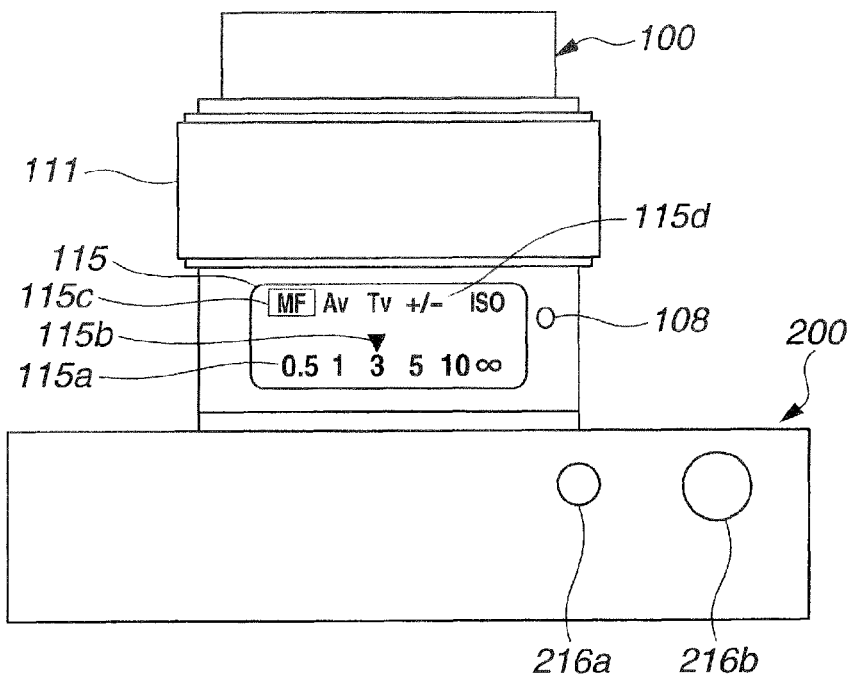
FIG. 28 is a diagram showing a display example at the time when an MF mode is selected in a digital camera to which an operation device according to a second embodiment of the present invention is applied.

FIG. 28 is a diagram showing a display example at the time when the mode switching operation section 108 is depressed and the MF mode is selected in processing equivalent to the processing in S202 of FIG. 23 in the action flowchart in the first embodiment.

FIGS. 29A to 29D respectively show states in which the operation ring 111 is rotated to switch display during the MF mode selected by the mode switching operation section 108.

FIGS. 30A to 30C and FIGS. 31A to 32E show two modifications concerning the display example in this embodiment.

Figure 32:
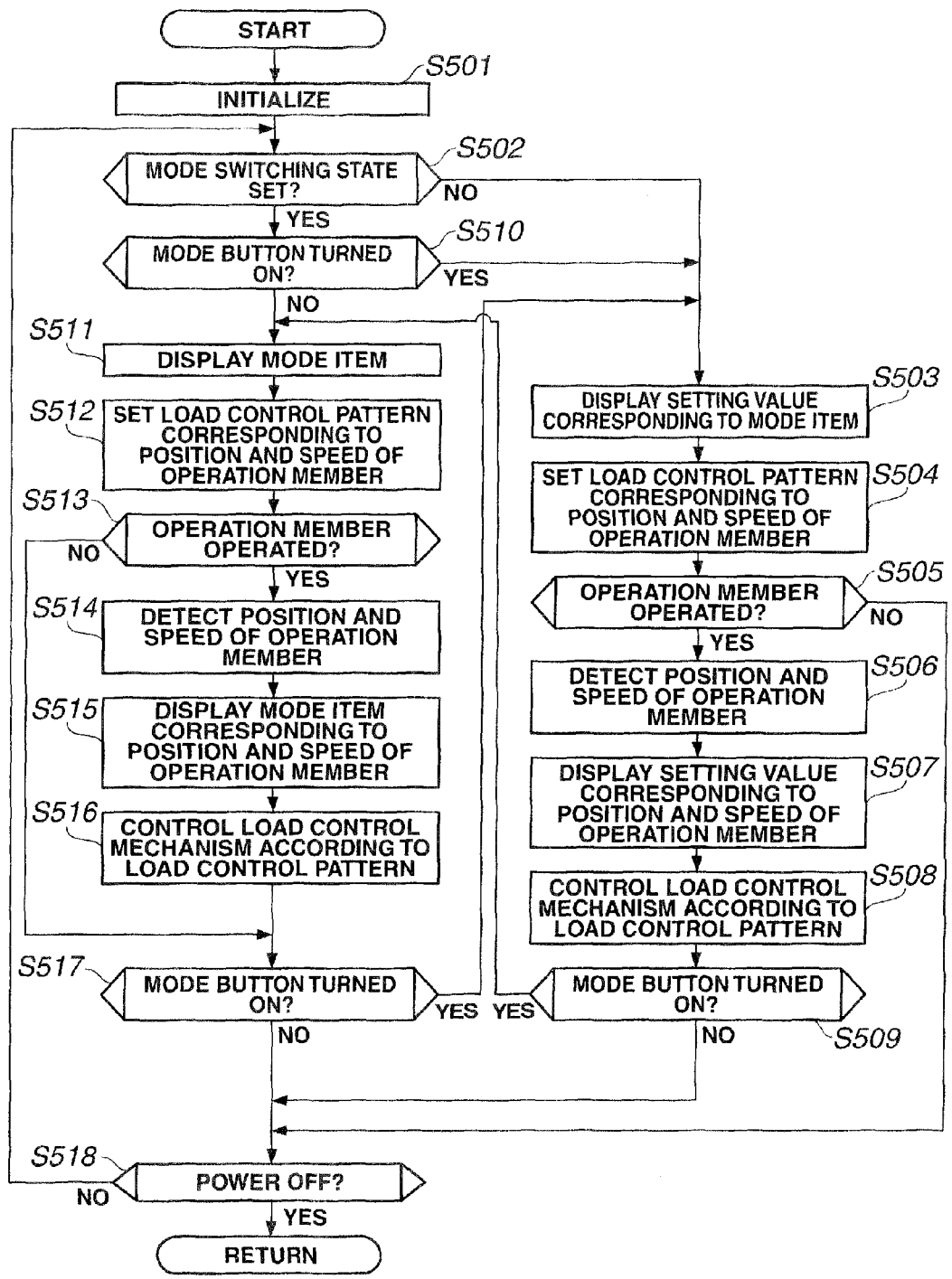
FIG. 32 is a flowchart for explaining a processing sequence of display operation (FIGS. 30A to 30C and FIGS. 31A to 31E) of the lens display section in the digital camera shown in FIG. 28.

FIG. 32 is a flowchart for explaining a display operation sequence in a lens barrel of a digital camera to which an operation device according to this embodiment is applied.

In FIG. 28, in the display section 115, mode items such as "MF" indicating the manual focus mode. "Av" indicating the mode for setting a diaphragm value, "Tv" indicating the mode for switching shutter speed, "+/−" indicating the mode for setting an exposure correction value, and "ISO" indicating the mode for setting ISO sensitivity are displayed on a mode display section 115d. When a user selects a desired mode out of these mode items by depressing the mode switching operation section 108, the selected mode is displayed while being surrounded by a mode display frame 115c having a rectangular shape. Mode content of the selected mode is displayed on a lower side of the mode display frame 115c as a memory 115a. The memory 115a is moved with respect to an indicator 115b and displayed according to rotation of the operation ring 111.

Figure 29A:
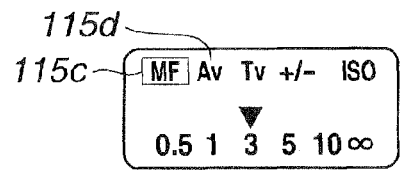
FIG. 29A is a diagram showing a state in which a lens display section of the digital camera shown in FIG. 28 is set in the MF mode.

As indicated by initial state display in FIG. 29A, a mode name "MF" indicating the MF mode is displayed while being surrounded by the mode display frame 115c. This indicates that the MF mode is selected by the mode switching operation section 108 as a present mode.

Concerning a photographing distance of the interchangeable lens barrel 100, the indicator 115b indicates "3" of the memory 115a that represents a photographing distance of the indicator 115b. Therefore, it is displayed that the operation ring 111 is rotated and a photographing distance of 3 m is selected.

When the operation ring 111 is rotated in this state, according to a rotating direction and a rotation position of the operation ring 111, the memory 115a is sequentially moved in the rotating direction and displayed.

Figure 29B:
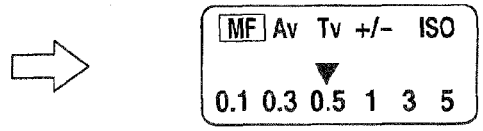
FIG. 29B is a diagram showing a state after rotation operation for an operation ring is performed in the state shown in FIG. 29A to perform display switching.

FIG. 29B shows that a photographing distance of 0.5 m is selected by right rotation (a direction viewed from the user) of the operation ring 111.

Figure 29C:
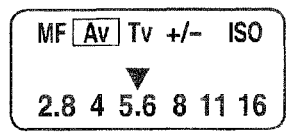
FIG. 29C is a diagram showing a state after depression operation for a mode switching operation section is performed in the state shown in FIG. 29A to perform operation mode switching.
Figure 29D:
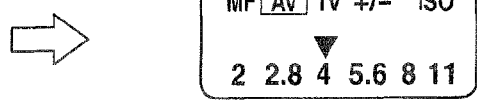
FIG. 29D is a diagram showing a state after rotation operation for the operation ring is performed in the state shown in FIG. 29C to perform display switching.

FIG. 29C shows a state in which the user depresses a mode button, which is the mode switching operation section 108, to select the diaphragm mode (hereinafter referred to as Av mode) (mode switching operation section ON) in the initial state display in FIG. 29A. When the Av mode is selected, the memory 115a changes to F number display of a diaphragm set beforehand. An F number indicated by the indicator 115b is also set beforehand. As this F number, a numerical value stored in the flash memory 107 of the interchangeable lens barrel 100 is invoked and displayed.

When the operation ring 111 is rotationally operated in the state shown in FIG. 29C, according to a rotating direction and a rotation position of the operation ring 111, the memory 115a sequentially moved in the rotating direction and displayed. At this point, as explained in the processing in S305 in FIG. 24, the load control mechanism 170 (the transducer 171) is controlled and a sense of click is generated in the operation ring 111. Specifically, a sense of click is generated every time the F number shifts by one with respect to the indicator 115b according to the rotation of the operation ring 111.

Figure 30A:
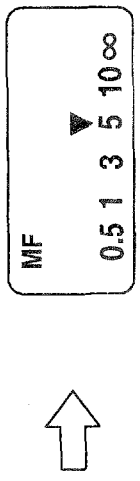
FIG. 30A is another display example of the lens display section of the digital camera shown in FIG. 28 and is a diagram showing a state in which the lens display section is set in the MF mode.
Figure 30B:
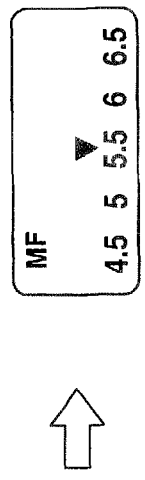
FIG. 30B is a diagram showing a state after low-speed rotation operation for the operation ring is performed in the state shown in FIG. 30A to perform display switching.
Figure 30C:
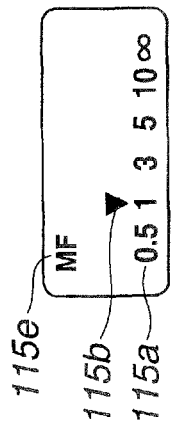
FIG. 30C is a diagram showing a state after high-speed rotation operation for the operation ring is performed in the state shown in FIG. 30B to perform display switching.

FIGS. 30A to 30C are modifications in which display content is changed according to rotating speed of the operation ring 111.

In the following explanation, "low-speed rotation" is defined as a value of clicks in a rotating direction of the operation ring 111 equal to or smaller than twice/sec and "high-speed rotation" is defined as a value of rotation clicks of the operation ring 111 larger than twice/sec. However, since a sense is different depending on a person, this definition is only an example.

Detection of rotating speed is performed by differentiating position data detected by a position detection sensor such as a publicly-known photo-sensor or magnetic sensor. The microcomputer 106 is configured to determine the rotating speed on the basis of the criteria explained above.

As indicated by an initial state shown in FIG. 30A, when the MF mode is selected by the mode button, which is the mode switching operation section 108, a mode name 115e "MF" is displayed on the mode display section 115. An object distance and the indicator 115b indicating that a photographing distance is "1 m" are displayed on the memory 115a.

When the operation ring 111 is rotated at low speed with clicks in this initial state, as indicated by operation ring low-speed rotation in FIG. 30B, the object distance of the memory 115a is changed to finer numerical values (4.5 to 6.5 at an interval of 0.5). When the operation ring 111 continues to be rotated at low speed with clicks, the memory 115a moves with respect to the indicator 115b. A change in the object distance with respect to a rotation angle of the operation ring 111 also becomes finer in association with the change of the display.

When the operation ring 111 is rotated at high speed with clicks from the state shown in FIG. 30B, as shown in FIG. 30C, the object distance of the memory 115a changes to rough numerical values. A change in the object distance with respect to the rotation operation angle of the operation ring 111 also becomes rough. It goes without saying that, as in a general MF mode, rotation resistance to the operation ring 111 may be set in a state without a sense of click.

The display is changed according to the rotating speed of the operation ring 111 and the rotation angle of the operation ring 111 is associated with the change in this way. Consequently, when the user desires to precisely adjust the object distance, it is possible to slowly rotate the operation ring 111 and precisely adjust the object distance.

When the user desires to quickly change the object distance, it is possible to quickly rotate the operation ring 111 to substantially change the object distance. Therefore, irrespective in which position the object is present, operation and display are associated. Therefore, it is possible to smoothly and quickly change the object distance without a sense of discomfort.

FIGS. 31A to 31F show another modification. Control is performed to enable the user to perform mode change operation according to rotating speed of the operation ring 111.

More specifically, in the other modification, the user changes the camera to a mode changeable state by depressing the mode switching operation section 108 once rather than performing a mode change by depressing the mode switching operation section 108 plural times. Thereafter, the user performs the mode change according to a rotation position of the operation ring 111.

Figure 31A:
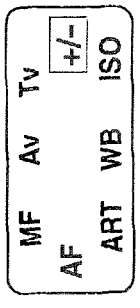
FIG. 31A is still another display example of the lens display section of the digital camera shown in FIG. 28 and is a diagram showing a state in which the lens display section is set in the MF mode.

In the other modification, when the mode switching operation section 108, which is the mode button, is turned on in the initial state shown in FIG. 30A, the mode display section 115 changes to a mode button ON state as shown in FIG. 31A. This state is a mode switching state in which a mode can be changed according to rotation of the operation ring 111. At this point, the respective modes of MF, Tv, and +/− are displayed on the mode display section 115. Further, the mode display frame 115c is displayed, whereby it is displayed that the mode display section 115 is in a state in which "MF" is selected.

When the operation ring 111 is slowly rotated with clicks in the state shown in FIG. 31A, the mode display frame 115c sequentially moves in the right direction and the mode is switched. For example, a state shown in FIG. 31B ("operation ring low-speed rotation") a display example of a state in which the mode is switched to "Av."

Figure 31B:
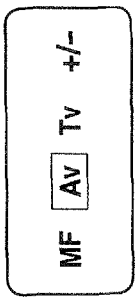
FIG. 31B is a diagram showing a state after the rotation operation for the operation ring is performed in the state shown in FIG. 31A to perform mode switching.
Figure 31C:
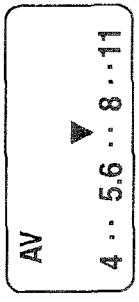
FIG. 31C is a diagram showing a state after the high-speed rotation operation for the operation ring is performed in the state shown in FIG. 31B to perform mode switching.

When the operation ring 111 is quickly rotated with clicks from the state shown in FIG. 31B, the display changes to display representing the respective modes as shown in FIG. 31C ("operation ring high-speed rotation"). Specifically, MF, Av, Tv, +/−, ISO, WB, ART, and AF are displayed while being arranged in order clockwise in positions along a peripheral edge of the display section 115. The mode is sequentially switched to correspond to a rotation direction of the operation ring 111. In the state shown in FIG. 31C, the mode display frame 115c is displayed to surround "+/−." It is displayed that the "+/−" mode is selected and the mode is switched.

Figure 31D:
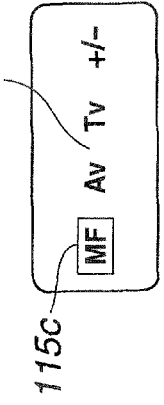
FIG. 31D is a diagram showing a state after an operation mode is fixed by depression operation for the mode switching operation section in the state shown in FIG. 31B.

On the other hand, when the mode switching operation section 108 is turned on in the display state shown in FIG. 31B, a mode selected at that point (the Av mode in the example shown in FIG. 31B) is fixed. As shown in FIG. 31D, the Av mode is selected and selection items in the Av mode are displayed. In other words, in a display example shown in FIG. 31D, the Av mode is selected and F numbers are displayed on the memory 115a.

Figure 31E:
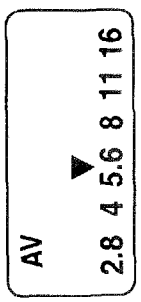
FIG. 31E is a diagram showing a state after the low-speed rotation operation for the operation ring is performed in the state shown in FIG. 31D to perform display switching.

When the operation ring 111 is slowly rotated (low-speed rotation) in this state, as shown in FIG. 31E, as in the object distance display (see FIG. 30C), the memory 115a changes to finer display. Specifically, in the display shown in FIG. 31F, the F number display is performed, numerical value display for each stage of an exposure amount is performed, and display of plural dots is performed among numerical values. The dots of the dot display represent, with one scale, an interval of an exposure amount of a ⅓ stage. Such a number-of-stages interval may be set rougher or plural modes having different intervals of the number of stages may be provided.

FIG. 32 is an example of a flowchart for explaining a processing sequence in causing the display section 115 to execute the display operation shown in FIGS. 30A to 30C and FIGS. 31A to 31E.

When the power switch 216a (see FIG. 28) of the camera is turned on, the microcomputer for lens 106 in the lens executes operation for initialization (S501).

Subsequently, the microcomputer for lens 106 determines whether the mode switching operation section 108 is depressed and the camera is in the mode changeable state (S502). If a result of the determination is No, the microcomputer for lens 106 determines that it is possible to change the mode according to a rotation position of the operation ring 111 and displays the mode set in the operation ring 111 on the memory 115a of the display section 115 (S503).

The microcomputer for lens 106 reads a load pattern corresponding to a position and speed of the operation ring 111 in that mode state into the microcomputer for lens 106 (S504) and determines whether the operation ring 111, which is the operation member, is operated (S505). If a result of the determination is No, the microcomputer for lens 106 determines whether the power switch is turned off (S518).

On the other hand, if a result of the determination in the processing in S505 is Yes, the microcomputer for lens 106 detects a position and speed of the operation ring 111 (S506)

and displays a setting value corresponding to the position and the speed (S507). Setting values and load patterns corresponding to positions and speeds are stored, for example, in the flash memory 107 as a table in advance.

Subsequently, the microcomputer for lens 106 controls the load control mechanism 170 according to the load pattern and gives a predetermined sense of operation of the operation ring 111 (S508). The microcomputer for lens 106 determines whether the mode button is turned on (S509). If the mode button is not turned on, the microcomputer for lens 106 determines whether the power switch is off (S518).

On the other hand, if a result of the determination in the processing in S509 is Yes, as in the case of Yes in the determination in the processing in S510, the operation ring 111 changes to a mode setting state. The microcomputer for lens 106 displays mode items (S511).

The microcomputer for lens 106 reads a load pattern corresponding to a position and speed of the operation ring 111 into the microcomputer for lens 106 (S512). Since the operation ring 111 is the operation member for performing mode setting, a load pattern for generating a sense of click is set for each of the modes.

The microcomputer for lens 106 determines, from an output signal of the position sensor 109A that detects a position of the operation ring 111, whether the operation ring 111 is operated (S513). If the operation ring 111 is operated, the microcomputer for lens 106 determines whether operation same as the operation in steps S506, S507, and S508 is performed in, in steps S514, S515, and S516 and the mode button is turned on (S517).

On the other hand, if a result of the determination in the processing in step S513 is No, the microcomputer for lens 106 determines whether the mode button is turned on (S517). If a result of the determination in the processing in S517 is Yes, the microcomputer for lens 106 executes a series of operation in step S503 and subsequent steps. If a result of the determination is No, the microcomputer for lens 106 determines whether the power supply is off (S518). If a result of the determination in the processing in S518 is Yes, the operation ends. If a result of the determination is No, the microcomputer for lens 106 returns to the determination of a mode switching state in step S502.

Third Embodiment

A third embodiment of the present invention is explained below with reference to FIGS. 33 to 37.

A basic configuration of this embodiment is substantially the same as that of the first embodiment. Therefore, FIGS. 2 and 3 referred to in the explanation of the first embodiment are also referred to in the explanation of this embodiment. The same components are denoted by the same reference numerals and signs. Only different members are denoted by new reference numerals and signs and explained.

Figure 33:
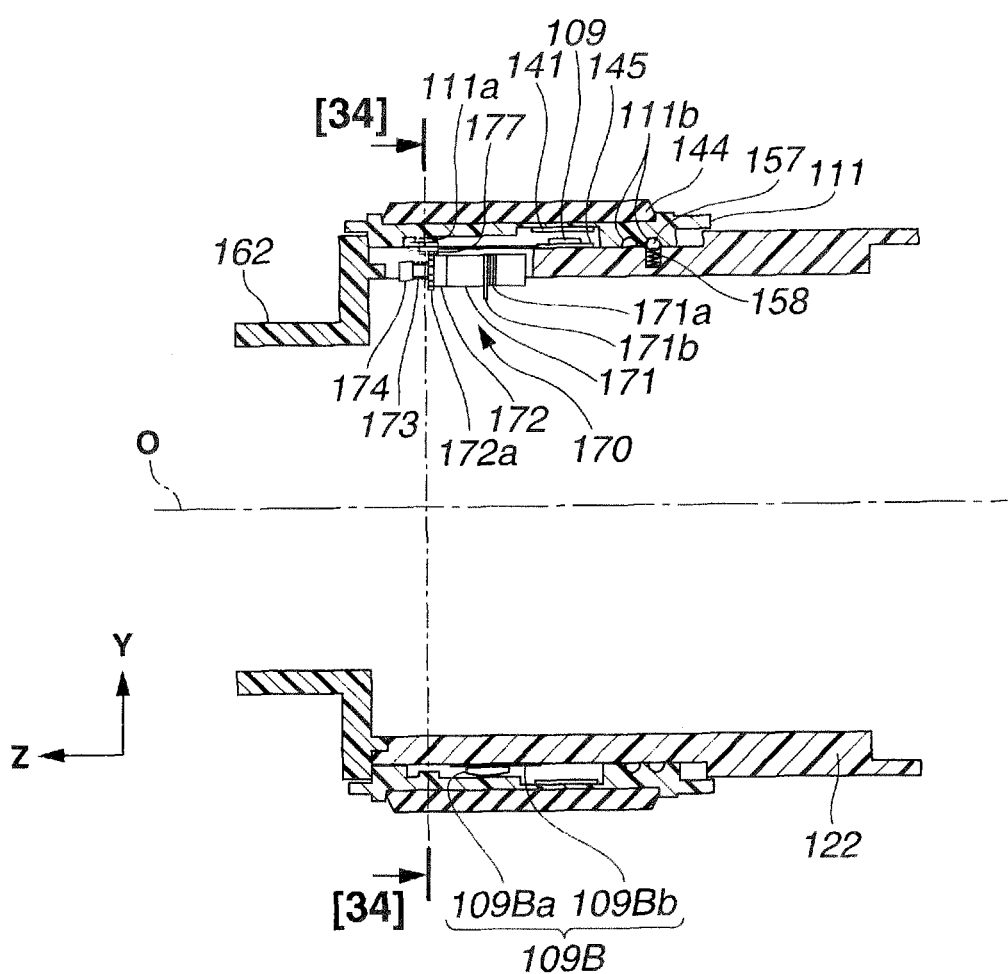
FIG. 33 is a main part sectional view showing a schematic configuration in an interchangeable lens barrel to which an operation device according to a third embodiment of the present invention is applied, wherein the lens barrel is configured such that an operation ring is slidable back and forth in an optical axis direction.
Figure 34:
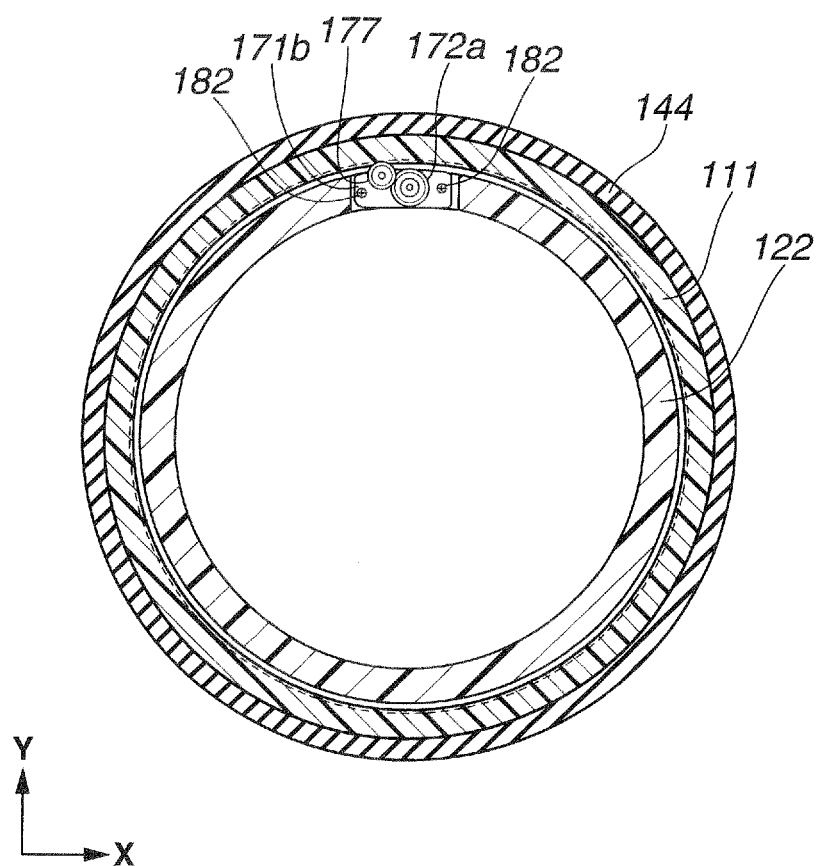
FIG. 34 is a sectional view taken along a line [34]-[34] in FIG. 33.

FIG. 33 is a schematic sectional view of a lens barrel to which an operation device according to the third embodiment of the present invention is applied. FIG. 34 is a sectional view taken along a line [34]-[34] in FIG. 33.

Figure 35:
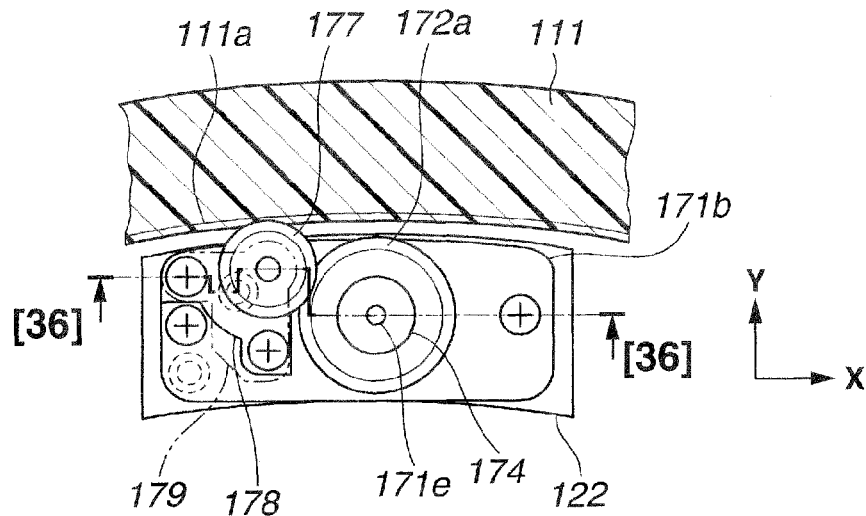
FIG. 35 is a front view showing, in enlargement, a load control mechanism in the interchangeable lens barrel shown in FIG. 34.
Figure 36:
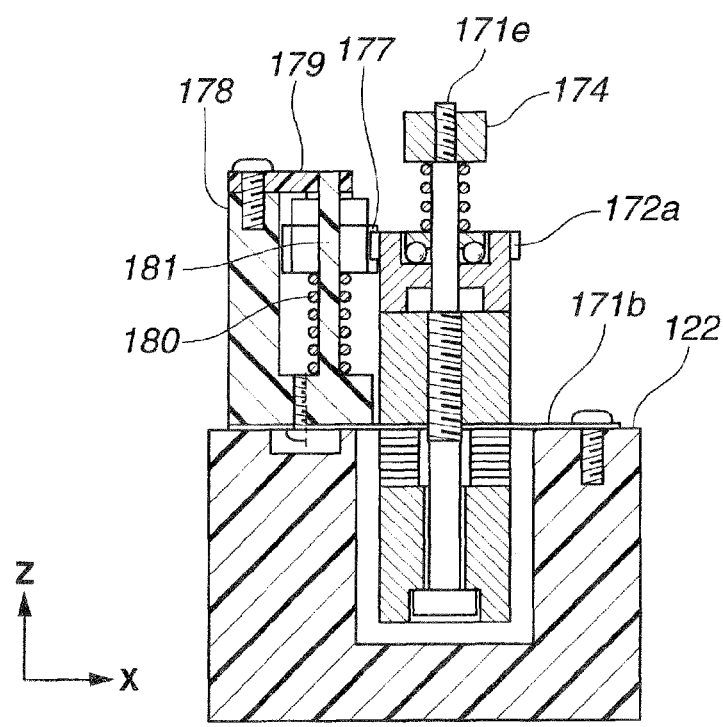
FIG. 36 is a sectional view taken along a line [36]-[36] in FIG. 35.
Figure 37:
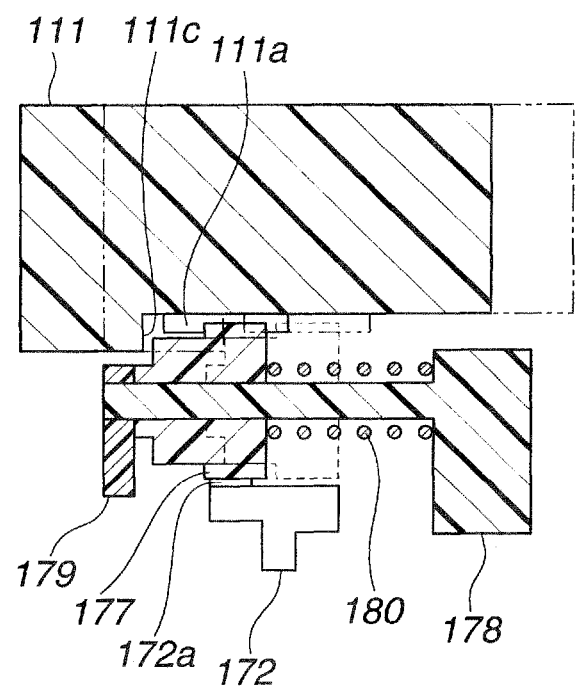
FIG. 37 is a diagram for explaining switching operation for a gear in sliding an operation ring in the interchangeable lens barrel shown in FIG. 33.

FIG. 35 is a diagram for explaining transmission mechanisms (gears 172a, 177, etc.) included in the load control mechanism 170 and is an enlarged view of a periphery of the gear 172a, the gear 177, and the fixed plate 171b shown in FIG. 34. FIG. 36 is a schematic diagram of a cross section along a line [36]-[36] in FIG. 35 and is a diagram for explaining a relation between the gear 172a and the gear 177 included in the load control mechanism 170. Further, FIG. 37 is a diagram for explaining operation of the gear 177 in sliding the operation ring 111. The gear 172a and the gear 177 are load control means in this embodiment.

In the lens barrel in this embodiment, an operation ring is configured to be capable of being slid back and forth in an optical axis direction.

As shown in FIGS. 33 and 34, the operation ring 111, on an outer circumference of which a rubber 144 for slip resistance is provided and on an inner surface of which a gear 111a is provided, is configured to be capable of being manually slid back and forth and rotated with respect to the fixed frame 122 in an optical axis direction of the interchangeable lens barrel 100. On a circumferential surface side without the operation ring 111, plural grooves 111b in which the balls 157 fit are formed along the circumference.

The balls 157 are pressed to the grooves 111b side by the spring 158 provided in the fixed frame 122. For example, when the operation ring 111 slides to the camera main body 200 side, the fitting of the balls 157 changes from the grooves 111b to the grooves 111b to give a sense of click to the user and inform, with the sense of click, the user that the operation ring 111 slides.

As shown in FIGS. 35 and 36, the load control mechanism 170 same as the one explained with reference to FIG. 2 in the first embodiment and a gear table 178 arranged in parallel to the load control mechanism 170 are fixed to the fixed frame 122 via the fixed plate 171b.

On the gear table 178, a shaft 181 parallel to the bolt 171e included in the load control mechanism 170 and a spring 180 and the gear 177 arranged on the shaft 181 are arranged. The gear 111a of the operation ring 111 meshes with a gear of the rotor 172 included in the load control mechanism 170 via the gear 177. The gear 177 and the gear of the rotor 172 configure load means in this embodiment.

As shown in FIG. 37, in the operation ring 111, a flange 111c for moving the gear 177 against the spring 180 when the operation ring 111 is slid to the camera main body 200 side is provided. Therefore, the gear 177 is pushed to move in a sliding direction in association with the sliding of the operation ring 111, whereby meshing of the gear 177 and the gear 111a is released. Then, the operation ring 111 can smoothly rotate without receiving a load of the load control mechanism 170, i.e., even if the load control mechanism 170 is not energized.

A rotation position of the operation ring 111 is detected by the sensor 109 and the scale 141. However, a position and size of the scale 141 are set such that a position in a rotation direction of the operation ring 111 by the position sensor 109 can be performed even in a state in which the operation ring 111 is slid back and forth as shown in FIG. 37.

A state in which the operation ring 111 slides to the object side with respect to the camera main body 200, i.e., a state in which the gear 172a of the rotor 172 and the gear 177 mesh with each other (a state shown in FIG. 37) is a state of operation mode switching, which is the processing in S203 in FIG. 23 explained in the first embodiment. A state in which the operation ring 111 slides to the camera main body 200 side, i.e., a state in which the meshing of the gear 172a of the rotor 172 and the gear 177 is released is a state of the manual focus mode in which zoom focus is possible.

When the operation ring 111 is slid to the object side again, the gear 177 is pressed to the object side by the spring 180 and about to mesh with the gear of the rotor 172. However, if a rotation shift (play) of the operation ring 111 is large, teeth of the gear of the rotor 172 and teeth of the gear 177 interfere with each other and the gear of the rotor 172 and the gear 177 do not easily mesh with each other. To prevent such a situation, if the operation ring 111 is rotated a very small amount with the rotation shift (play) reduced to a level equal to or smaller than one pitch of the gear, the gear of the rotor 172 and the gear 177 surely mesh with each other.

A slide position of the operation ring 111 is detected by the slide start detection sensor 109B including a switch and a switch substrate as shown in FIG. 33. The slide start detection sensor 109B is provided to be capable of detecting a position of the operation ring 111 slid to the object side and a position of the operation ring 111 slid to the camera main body 200 side. The camera is switched to the manual focus by turn-off of the switch at the time when the operation ring 111 is slid to the camera main body 200 side. The camera is switched to the operation mode for switching the operation mode (the processing in S203 in FIG. 23; operation mode switching) by turn-on of the switch at the time when the operation ring 111 is slid to the object side.

If the operation ring 111 is configured to be capable of sliding back and forth in this way, the switch can be configured to be turned on only once when the operation ring 111 is reciprocatingly slid in a front rear direction. For example, the switch is turned on in a position where the operation ring 111 is slid to the object side and the switch is changed over from on to off when the operation ring 111 is slid to the camera main body 200 side. Then, a rotation touch of the operation ring 111 can be changed in the position where the operation ring 111 is slid to the object side. The operation ring 111 can be used as an operation member for manual focus in the position where the operation ring 111 is slid to the switched-off camera main body 200 side.

Further, the operation ring 111 may be pressed to the object side or the camera main body 200 side rather than being mechanically slid. A pressure sensor that detects pressure during the pressing may be provided in the operation ring 111 or the fixed frame 122 to detect that slide operation is performed using detected pressure of the pressure sensor instead of the switch.

Fourth Embodiment

A fourth embodiment is explained below with reference to FIGS. 38 to 39.

A basic configuration of this embodiment is substantially the same as that in the first embodiment. Therefore, FIGS. 2 and 3 referred to in the explanation of the first embodiment are also referred to in the explanation of this embodiment. The same components are denoted by the same reference numerals and signs. Only different members are denoted by new reference numerals and signs and explained.

This embodiment is an illustration of a case in which, when the operation ring 111, which is the manual operation member, is operated to, for example, change setting items and setting values, the load control mechanism 170A that generates a sense of click in synchronization with the rotation of the operation ring 111 is configured using a motor 271 instead of the transducer 171 in the first embodiment.

Figure 38:
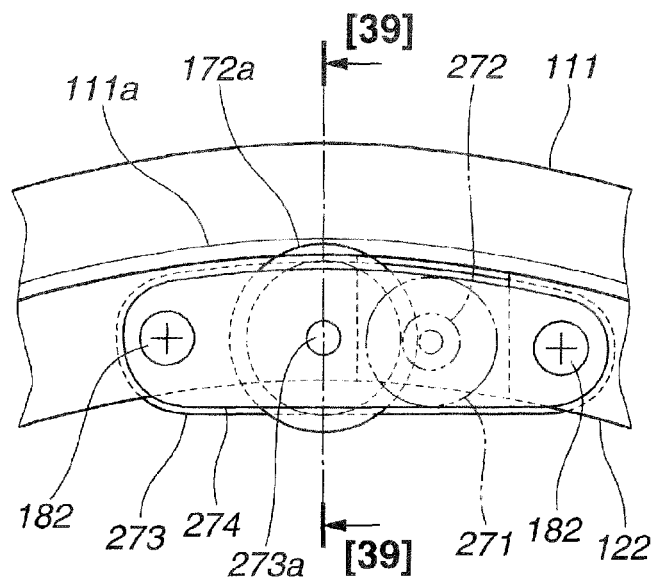
FIG. 38 is a diagram for explaining an attachment state of a load control mechanism, to a fixed frame of which a motor is applied, according to a fourth embodiment of the present invention.
Figure 39:
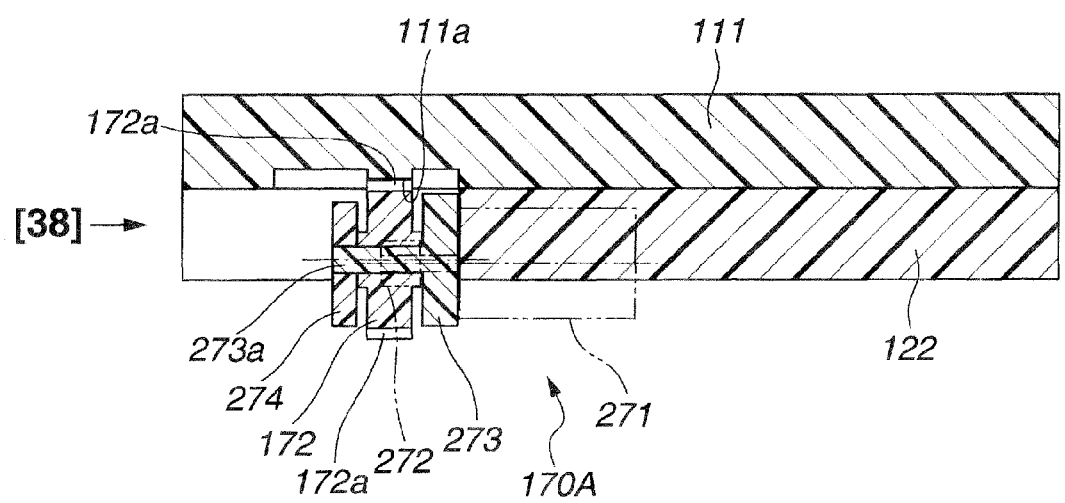
FIG. 39 is a diagram for explaining an attachment state of the load control mechanism, to which the motor is applied, in a sectional view taken along a line [39]-[39] in FIG. 38.

FIG. 38 is a diagram for explaining a load control mechanism (170A) attached to a fixed frame (122) of an interchangeable lens barrel in a digital camera to which an operation device according to the fourth embodiment of the present invention is applied. FIG. 38 is a front view of the load control mechanism (170A) viewed from an arrow [38] direction in FIG. 39. FIG. 39 is a sectional view showing a detailed configuration of the load control mechanism (170A) and taken along a line [39]-[39] in FIG. 38.

As shown in FIG. 38, the motor 271 forming a part of the load control mechanism 170A is fixedly provided in a main body 273. The main body 273 is fixed to the fixed frame 122 by the screws 182. A rotating shaft of the motor 271 is inserted through the main body 273. A pinion gear 272 is fixedly provided at a distal end of the rotating shaft. The pinion gear 272 is protrudingly provided, across the main body 273, on an opposite side of a region where the motor 271 is attached. The pinion gear 272 meshes with the gear 172a of the rotor 172 (load means), which is a rotating member. The gear 172a of the rotor 172 meshes with an internal gear 111a of the operation ring 111. The rotor 172 is arranged between the main body 273 and a top plate 274 and axially supported to be rotatable with respect to the main body 273 and the top plate 274.

In the load control mechanism 170A in this embodiment configured as explained above, the rotor 172 functions as the load means and the motor 271 functions as means for controlling rotation resistance of the operation ring 111.

Specifically, the rotor 172 rotatably fits in a shaft section 273a implanted in the main body 273. The gear 172a provided on an outer circumferential side meshes with each of the pinion gear 272 of the motor 271 and the internal gear 111a of the operation ring 111 as explained above.

Therefore, when coil terminals of the motor 271 are set in a short-circuit state, rotation resistance due to detent torque of the motor 271 is generated between the motor 271 and the rotor 172. An amount of the resistance is transmitted from the rotor 172 to the operation ring 111 through the meshing of the gear 172a and the internal gear 111a. An operation load is applied to the operation ring 111. Consequently, relative positions of the operation ring 111 and the fixed frame 122 is maintained.

When the operation ring 111 is not manually operated, it is also possible to set the coil terminals of the motor 271 in the short-circuit state to fixedly retain the rotation of the operation ring 111. The coil terminals of the motor 271 are set in the short-circuit state by switching action (ON action) of a switching element of a transistor connected to the coil terminals of the motor.

When the coil terminals of the motor 271 are set in an open state, the detent torque of the motor 271 is not generated. Rotation resistance between the pinion gear 272 and the rotor 172 is reduced. Therefore, it is possible to switch, by repeating an ON state and an OFF state of the switching element, the short-circuit state and the open state between the coil terminals of the motor 271 to create a sense of click in the operation ring 111. It is possible to change a click force amount, which is resistance, by providing plural resistors having different resistances connected to the coil terminals of the motor 271 in series and selecting a resistor to be connected and changing resistance using the switching element. In this case, when the resistance increases, if the coil terminals of the motor 271 are in the open state, the coil terminals are closer to each other. Therefore, the rotation resistance between the pinion gear 272 and the rotor 172 is lower.

Further, it is possible to obtain the same rotation resistance between the pinion gear 272 and the rotor 172 by performing so-called servo control for controlling the motor 271 using a motor driving circuit and stopping the motor 271 in a predetermined position. Specifically, in a state in which the rotation resistance between the pinion gear 272 and the rotor 172 is high, control for always placing the motor 271 in a click position only has to be applied on the basis of a position signal from a position detector. To change the rotation resistance at that point, a maximum value of an electric current flowing to the motor 271 only has to be changed according to a signal of the position detector.

According to the fourth embodiment including the configuration explained above, it is possible to obtain effects same as the effects of the first embodiment.

For example, only the microcomputer for body 214 can be configured to execute the main flow shown in FIGS. 21 and 22 and the processing flow of the digital camera explained in the control operation for the operation ring shown in FIG. 27. Only the microcomputer for lens 106 can be configured to execute the flows. Alternatively, the microcomputer for body 214 and the microcomputer for lens 106 can be configured to execute the flows in cooperation with each other.

For example, the operation ring 111 can be configured to be provided in the camera main body 200. In this case, for example, the operation ring 111 can be provided in the camera main body 200 as a rotary operation member such as a dial.

The digital camera is not limited to the camera of the interchangeable lens type and can be a camera of an un-interchangeable lens type (a fixed lens type). In this case, for example, the operation ring 111 can be provided in a lens barrel of the camera. As explained above, the operation ring 111 can be provided as a rotary operation member such as a dial.

In the digital camera, the switching of the setting is performed according to a rotation angle from the reference position of the operation ring 111. The reference position is an absolute position. However, the reference position can also be a relative position. For example, a position of the operation ring 111 at a point when the switching of the setting of the operation mode is performed only has to be set as a reference position to perform the switching of the setting according to a rotation direction and a rotation amount of the operation ring 111 from the reference position. In this case, it goes without saying that, for example, like the sense of click shown in FIG. 25 and the rotation resistance shown in FIG. 26, rotation resistance of the operation ring 111 is changed according to the rotation direction and the rotation amount.

The operation ring 111 can be configured to be capable of endlessly rotating or configured to rotate only in a fixed rotation angle range such as 180 degrees. In this case, for example, if the reference position is a relative position, the operation ring 111 can be configured to be capable or endlessly rotating. If the reference position is an absolute position, the operation ring 111 can be configured to rotate only in a fixed angle range.

The embodiments of the present invention are explained above. According to the embodiments, the operability of the operation ring 111 can be set to an appropriate sense of click and appropriate weight of the operation ring 111 according to the respective operation modes such as the focus mode, the zoom mode, the photographing mode, the ISO sensitivity mode, the shutter speed mode, and the diaphragm mode. The display of the operation mode changed by the operation ring 111 is changed to correspond to a position and speed of the operation ring 111. Therefore, it is possible to perform display having a sense of unity with operation.

The present invention is not limited to the embodiments explained above. It goes without saying that various modifications and applications can be carried out without departing from the spirit of the invention. The embodiments include inventions at various stages. Various inventions can be extracted according to appropriate combinations in the plural constituent features disclosed herein. For example, even if several constituent features are deleted from all the constituent features explained in the respective embodiments, if the problems to be solved by the invention can be solved and the effects of the invention can be obtained, a configuration in which the constituent features are deleted can be extracted as an invention. The present invention is not limited by a specific mode of implementation except that the invention is limited by the appended claims.

What is claimed is:

1. An operation device comprising:
    a fixed member;
    an operation member arranged to be manually rotatable with respect to the fixed member;
    a load section arranged in the fixed member and being configured to apply a predetermined load to the operation member when the operation member rotates;
    a transducer configured to come into friction contact with the load section in a state in which the transducer is pressed against the load section;
    a position detecting sensor which detects a relative position of the operation member with respect to one of the fixed member and the load section;
    an operation mode setting section which sets one of a photographing mode and an ISO sensitivity mode as an operation mode;
    a storing section which stores a first piece of information for determining a pattern of oscillation to be generated at the operation member based on the operation mode set by the operation mode setting section and a rotation interval of the operation member; and
    an oscillation control section which controls an oscillation applied to the load section by the transducer to thereby change a state of an oscillation applied to a user by the operation member when the operation member is rotated,
    wherein the oscillation control section changes an oscillation periodically applied to the operation member by the load section by changing one of an oscillation amplitude of the transducer and a driving voltage for driving the transducer, based on (i) a second piece of information regarding the rotation interval of the operation member which is determined based on an output from the position detecting sensor, (ii) the operation mode set by the operation mode setting section, and (iii) the first piece of information stored in the storing section).

2. The operation device according to claim 1, wherein the load section includes (i) a first rotating member which rotates in association with a rotation of the operation member and (ii) a second rotating member rotatably coupled to the first rotating member and set in friction contact with the transducer in a state in which the second rotating member is pressed towards the transducer, and
    wherein when a rotation force is applied to the first rotating member via the operation member, a rotation driving force from the first rotating member to the second rotating member is controlled by oscillation from the transducer.

3. The operation device according to claim 1, wherein when the operation mode is set, the oscillation control section reads out a period corresponding to the operation mode and a setting item of the operation mode from the storing section, controls the transducer based on the period, and changes the oscillation applied to the load section.

4. The operation device according to claim 1, wherein when the oscillation control section changes the oscillation applied to the operation member by the load section by changing the oscillation amplitude of the transducer, a direction of the oscillation amplitude is a direction in which the transducer and the load section are pressed to come into press contact with each other.

5. The operation device according to claim 1, wherein the oscillation control section changes the oscillation applied to the operation member by the load section by repeating a supply and a stop of a frequency voltage which is the driving voltage for driving the transducer.

6. The operation device according to claim 1, wherein (i) when the operation member is manually rotated to the right from a first rotation position to a reference position, the oscillation control section performs control to gradually increase, for a first predetermined time, a first contact friction force applied to the operation member in the first rotation position, to then change the first contact friction force to a second contact friction force and gradually decrease the second contact friction force for a second predetermined time and to then change the second contact friction force to the first contact friction force, and (ii) when the operation member is manually rotated to the left from a second rotation position to the reference position, the oscillation control section performs control to gradually increase, for a third predetermined time, the first contact friction force applied to the operation member in the second rotation position, to then change the first contact friction force to the second contact friction force and gradually decrease the second contact friction force for a fourth predetermined time, and to then change the second contact friction force to the first contact friction force, whereby the oscillation control section enables an operator to switch the operation member to a same reference position after the oscillation is applied to the user irrespective of whether the operation member is rotated to the right or to the left.

7. The operation device according to claim 1, wherein the oscillation control section controls to drive the transducer to (i) when the operation member is not manually operated, change to a non-driven state and fix and hold the operation member with a contact friction force, and (ii) when the position detecting sensor detects a start of a rotation operation of the operation member, reduce the contact friction force to the operation member and apply an oscillation corresponding to the operation mode to the load section.

8. The operation device according to claim 1, further comprising:
    a display section which performs a display corresponding to the operation mode set by the operation mode setting section; and
    a display changing section which changes a setting item of the display corresponding to the operation mode in association with a rotation operation of the operation member,
    wherein the display changing section changes a display form of information related to contents of the display corresponding to the operation mode based on a rotating speed of the operation member.

9. The operation device according to claim 1, wherein the load section includes:
    a first gear section provided on an inner circumferential surface of the operation member;
    a second gear section configured to mesh with the first gear section and apply a load to the first gear section; and
    a motor configured to apply a rotation driving force to the second gear section, and
    wherein the oscillation control section periodically applies the oscillation to the operation member by controlling an output of the motor to change the load applied to the first gear section by the second gear section.

10. The operation device according to claim 2, wherein the operation member is arranged along a rotating shaft of the operation member so as to be slidable to one of a first position and a second position, and
    wherein when the operation member slides to the first position, the first rotating member moves to a position where the first rotating member can transmit a driving force to the second rotating member, and when the operation member slides to the second position, the first rotating member moves to a position where the first rotating member cannot transmit the driving force to the second rotating member.

11. The operation device according to claim 10, further comprising a slide start detecting sensor which detects a start of a slide by the operation member towards one of the first position and the second position,
    wherein when the slide start detecting sensor detects the start of the slide by the operation member, the oscillation control section changes the transducer to a non-driven state and fixes and holds the second rotating member.

12. The operation device according to claim 8, wherein:
    the display form is a state in which a mode name selected by the operation mode setting section and a numerical value related to the mode name are displayed, and
    as the numerical value, when the rotating speed of the operation member is higher than a predetermined value, a first numerical value range is displayed at a first numerical value interval and, when the rotating speed of the operation member is lower than the predetermined value, the first numerical value range or a range smaller than the first numerical value range is displayed at a second numerical value interval.

13. The operation device according to claim 8, wherein:
    the display form is a selection display which displays a plurality of mode items and a mode name selected by the operation mode setting section from among the plurality of mode items, and
    when the rotating speed of the operation member is lower than a predetermined value, display is performed to move the selection display relative to the plurality of mode items and, when the rotating speed of the operation member is higher than the predetermined value, mode items larger in number than the plurality of mode items are arranged in an elliptical shape and the selection display is performed.

* * * * *